United States Patent
Katsura et al.

(10) Patent No.: US 10,724,616 B2
(45) Date of Patent: Jul. 28, 2020

(54) POWER TRANSMISSION APPARATUS FOR VEHICLE AND POWER TRANSMISSION SYSTEM FOR VEHICLE

(71) Applicant: EXEDY CORPORATION, Neyagawa-shi, Osaka (JP)

(72) Inventors: Hitoshi Katsura, Neyagawa (JP); Kohsuke Murata, Neyagawa (JP); Taichi Kitamura, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 205 days.

(21) Appl. No.: 15/769,232

(22) PCT Filed: Oct. 13, 2016

(86) PCT No.: PCT/JP2016/080394
§ 371 (c)(1),
(2) Date: Apr. 18, 2018

(87) PCT Pub. No.: WO2017/069040
PCT Pub. Date: Apr. 27, 2017

(65) Prior Publication Data
US 2018/0304733 A1    Oct. 25, 2018

(30) Foreign Application Priority Data

Oct. 20, 2015 (JP) .................................. 2015-206491
Sep. 20, 2016 (JP) .................................. 2016-183438

(51) Int. Cl.
*F16H 37/02* (2006.01)
*B60K 6/365* (2007.10)
(Continued)

(52) U.S. Cl.
CPC ........... *F16H 37/022* (2013.01); *B60K 6/365* (2013.01); *B60K 6/547* (2013.01); *B60W 20/10* (2013.01);
(Continued)

(58) Field of Classification Search
CPC ....... F16H 37/022; B60K 6/387; B60K 17/08; B60K 17/02; B60K 6/48; B60K 6/365;
(Continued)

(56) References Cited

U.S. PATENT DOCUMENTS 5,063,815 A * 11/1991 Oshidari ............. F16H 37/0846
477/38
5,846,155 A    12/1998 Taniguchi et al.
(Continued)

FOREIGN PATENT DOCUMENTS

EP    1808619 A1    7/2007
JP    H06-205573 A    7/1994
(Continued)

OTHER PUBLICATIONS

Apr. 24, 2018 International Preliminary Report on Patentability issued in International Patent Application No. PCT/JP2016/080394.
(Continued)

*Primary Examiner* — Patrick H Mackey
(74) *Attorney, Agent, or Firm* — United IP Counselors, LLC

(57) ABSTRACT

A power transmission apparatus for vehicle, incorporated in a vehicle equipped with a transmission, includes a forward-reverse switching mechanism with start function produced by adding a function of a vehicle start clutch to the forward-reverse switching mechanism. Additionally, a power transmission system for vehicle includes an internal combustion engine that is a power source for vehicle driving, the transmission, a torsional vibration damper that transmits
(Continued)

torque of the internal combustion engine to the transmission, and the forward-reverse switching mechanism with start function of the power transmission apparatus for vehicle. The forward-reverse switching mechanism with start function is disposed between the transmission, and the internal combustion engine and the torsional vibration damper.

18 Claims, 18 Drawing Sheets

(51) Int. Cl.

| | | |
|---|---|---|
| *F16H 9/12* | (2006.01) | |
| *B60W 20/10* | (2016.01) | |
| *B60K 6/547* | (2007.10) | |
| *B60K 6/543* | (2007.10) | |
| *B60K 6/48* | (2007.10) | |
| *F16H 3/66* | (2006.01) | |
| *F16H 3/72* | (2006.01) | |
| *B60K 1/02* | (2006.01) | |

(52) U.S. Cl.
CPC .............. *F16H 9/12* (2013.01); *B60K 1/02* (2013.01); *B60K 6/543* (2013.01); *B60K 2006/4825* (2013.01); *B60Y 2200/92* (2013.01); *B60Y 2400/72* (2013.01); *F16H 3/663* (2013.01); *F16H 3/725* (2013.01); *F16H 3/728* (2013.01); *F16H 2037/026* (2013.01); *F16H 2200/2005* (2013.01); *F16H 2200/2023* (2013.01); *F16H 2200/2035* (2013.01)

(58) Field of Classification Search
CPC ...... H02K 7/116; H02K 7/006; H02K 21/024; H02K 7/12; H02K 21/14; B60L 50/16; B60L 15/2054
See application file for complete search history.

(56) References Cited

U.S. PATENT DOCUMENTS

| | | | |
|---|---|---|---|
| 5,876,306 A | 3/1999 | Murata | |
| 7,066,860 B2* | 6/2006 | Habuchi | F16H 37/027 475/208 |
| 7,819,212 B2* | 10/2010 | Kawasaki | B60K 6/365 180/65.265 |
| 9,404,563 B2* | 8/2016 | Yamamoto | F16H 37/0846 |
| 9,458,928 B2* | 10/2016 | Kawakami | F16H 61/0028 |
| 9,664,278 B2* | 5/2017 | Toyoda | F16H 37/022 |
| 9,689,477 B2* | 6/2017 | Versteyhe | F16H 15/52 |
| 2003/0162620 A1* | 8/2003 | Kmicikiewicz | B60K 6/36 475/211 |
| 2010/0075800 A1 | 3/2010 | Suzuki et al. | |
| 2012/0283901 A1* | 11/2012 | Nagura | B60W 50/029 701/22 |
| 2016/0290418 A1* | 10/2016 | Kotsuji | F16D 48/06 |
| 2017/0023113 A1* | 1/2017 | Walter | F16H 37/022 |

FOREIGN PATENT DOCUMENTS

| | | | |
|---|---|---|---|
| JP | H09-37411 A | | 2/1997 |
| JP | H09-236139 A | | 9/1997 |
| JP | 3826730 B2 | | 9/2006 |
| JP | 2006-280195 A | | 10/2006 |
| JP | 2007-192351 A | | 8/2007 |
| JP | 2007192351 A | * | 8/2007 |
| JP | 2009-001126 A | | 1/2009 |
| JP | 2009001126 A | * | 1/2009 |
| JP | 4597138 B2 | | 12/2010 |
| JP | 4660583 B2 | | 3/2011 |
| JP | 2013-016642 A | | 1/2013 |
| JP | 5159683 B2 | | 3/2013 |

OTHER PUBLICATIONS

Jan. 10, 2017 Search Report issued in International Patent Application No. PCT/JP2016/080394.

* cited by examiner

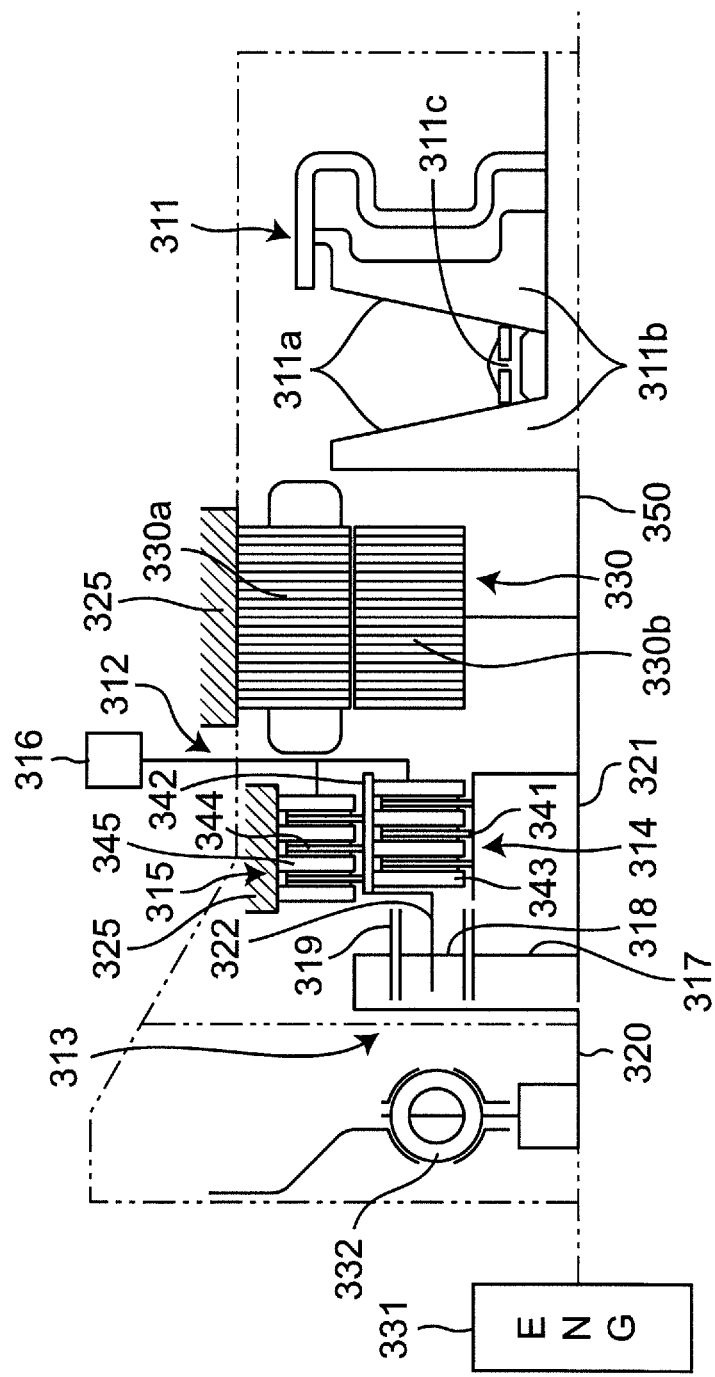

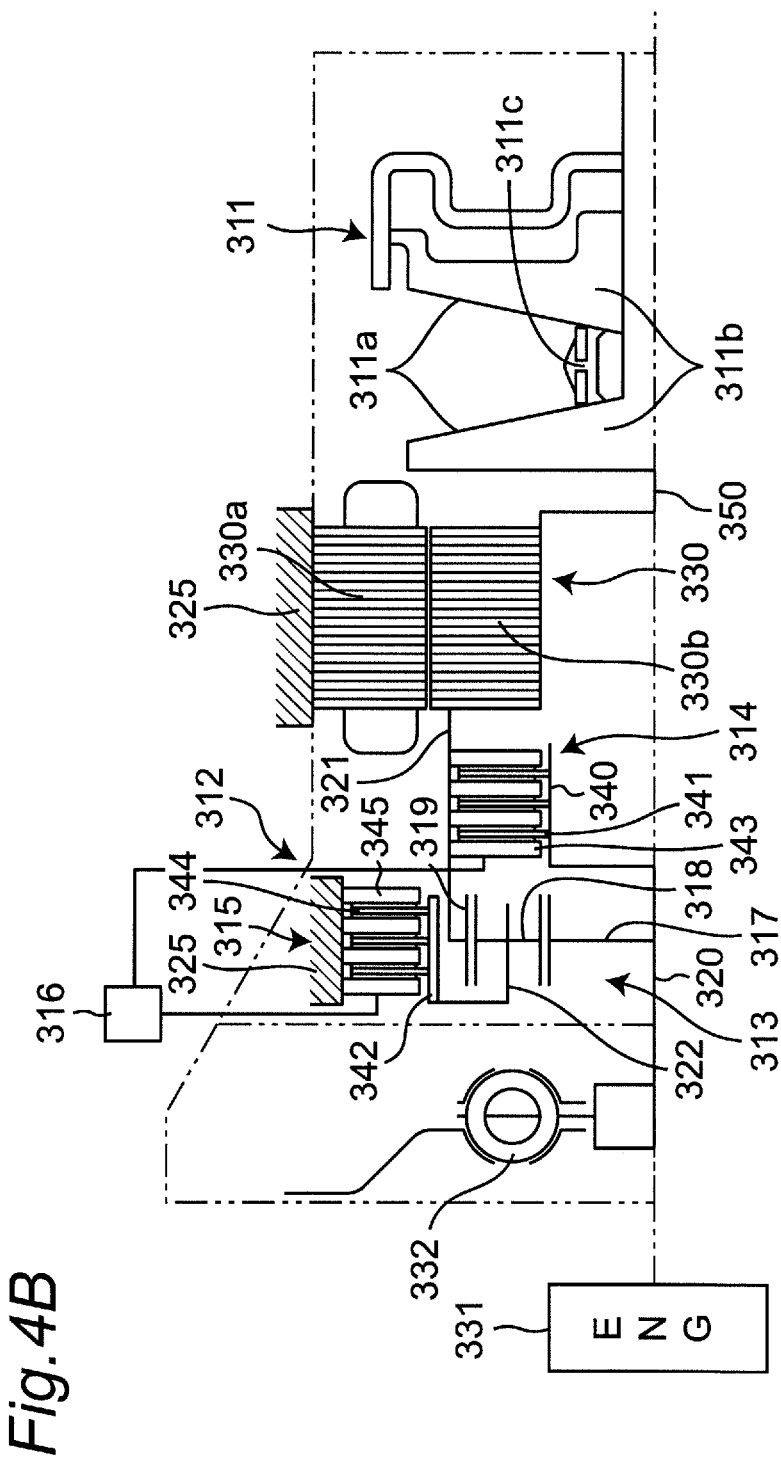

POWER TRANSMISSION
POWER TRANSMISSION APPARATUS FOR VEHICLE AND POWER TRANSMISSION SYSTEM FOR VEHICLE

TECHNICAL FIELD

The present invention relates to a power transmission apparatus for vehicle, and a power transmission system for vehicle.

BACKGROUND ART

There has been known a conventional art, as illustrated in FIG. 5, which includes a torque converter 302 disposed between an internal combustion engine 300 as a power source and a transmission 301, and having a function of vehicle start, and further includes a forward-reverse switching mechanism 306 including a planetary gear 303, a friction clutch 304, and a friction brake 305, and disposed on the downstream side of the torque converter 302, for example (see Patent Literature 1 to 3).

CITATION LIST

Patent Literature

PTL 1: Publication of Japanese Patent No. 3826730
PTL 2: Publication of Japanese Patent No. 4597138
PTL 3: Publication of Japanese Patent No. 5159683

SUMMARY OF INVENTION

Technical Problem

Space reduction of an existing internal combustion engine or power transmission apparatus has been demanded with increase in a cabin space of a vehicle and addition of an electric motor to a power source of a vehicle.

Accordingly, an object of the present invention is to solve the aforementioned issue, by providing a power transmission apparatus for vehicle and a power transmission system for vehicle each capable of fulfilling a space reduction demand.

Solution to Problem

In accomplishing these and other objects, according to an aspect of the present invention, there is provided a power transmission apparatus for vehicle, the apparatus, incorporated in a vehicle equipped with a transmission, comprising a forward-reverse switching mechanism with start function produced by adding a function of a vehicle start clutch to the forward-reverse switching mechanism.

Advantageous Effects of Invention

According to the above-described aspect of the present invention, fulfillment of a space reduction demand is achievable by integrating functions of a start device and a forward-reverse switching mechanism conventionally configured by different components into one apparatus.

BRIEF DESCRIPTION OF DRAWINGS

These and other objects and features of the present invention will become apparent in the light of following description relating to preferred embodiments describing the accompanying drawings. In the drawings:

FIG. 4A is a schematic configuration view of a power transmission apparatus for vehicle according to a modified example of the first embodiment of the present invention;

FIG. 4B is a schematic configuration view of a power transmission apparatus for vehicle according to a modified example of the first embodiment of the present invention;

DESCRIPTION OF EMBODIMENTS

Figure 1:
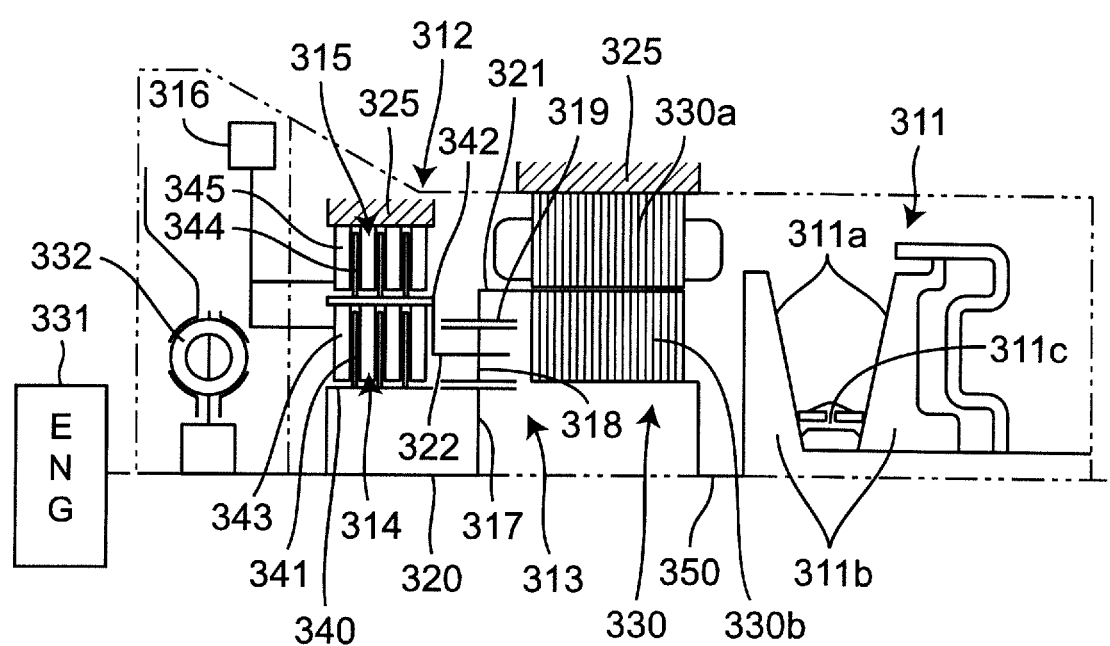
FIG. 1 is a schematic configuration view of a power transmission apparatus for vehicle according to a first embodiment of the present invention.

Embodiments according to the present invention are hereinafter described in detail with reference to the drawings.

First Embodiment

A power transmission apparatus for vehicle according to a first embodiment of the present invention is incorporated in a vehicle equipped with a transmission. The power transmission apparatus for vehicle adds a function of a vehicle start clutch to a forward-reverse switching mechanism including a planetary gear, a friction clutch, and a friction brake to eliminate an existing start device such as a torque converter and thereby achieve space reduction. Moreover, improvement of fuel consumption of a vehicle is achievable by positioning an electric motor in a space produced by eliminating an existing start device or by other methods, and thereby constituting a hybrid system including an internal combustion engine and the electric motor.

The power transmission apparatus for vehicle according to the first embodiment is incorporated in a vehicle equipped with a transmission 311, and includes a forward-reverse switching mechanism with start function 312 produced by adding a function of a vehicle start clutch to the forward-reverse switching mechanism.

The forward-reverse switching mechanism with start function 312 includes a planetary gear 313, a friction clutch 314, a friction brake 315, and a control mechanism 316 which performs closing control (closing or opening) of the friction clutch 314 and/or the friction brake 315. The friction clutch 314 and the friction brake 315 are disposed on the upstream side of the planetary gear 313. The control mechanism 316 herein is a hydraulic piston or an electric actuator, for example, which independently closes or opens the friction clutch 314 and/or the friction brake 315. For example, the friction clutch 314 transmits a torque by an axial press against disks 341 and driven plates 343 alternately overlapped with each other. In this case, a pressing action is achievable by a direct press with a hydraulic piston or by a press with an electric actuator via a bearing. The friction brake 315 stops rotation by an axial press against disks 344 and driven plates 345 alternately overlapped on each other.

In this case, a pressing action is achievable by a direct press with a hydraulic piston or by a press with an electric actuator via a bearing.

An operation of the power transmission apparatus for vehicle according to the first embodiment, which includes the forward-reverse switching mechanism with start function 312, is hereinafter described in comparison with an operation of a power transmission apparatus for vehicle in a conventional art, which includes a forward-reverse switching mechanism without start function.

Figure 2A:
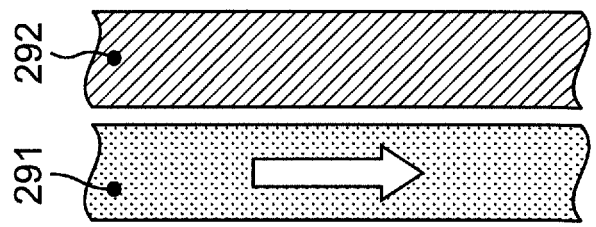
FIG. 2A is an explanatory view illustrating an opened state of an input side member and an output side member of the power transmission apparatus for vehicle according to the first embodiment of the present invention.
Figure 2B:
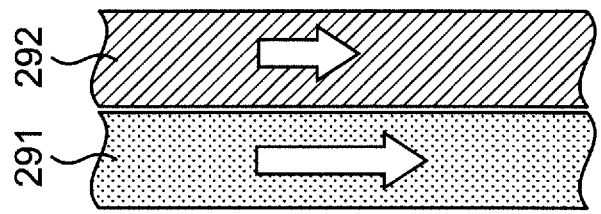
FIG. 2B is an explanatory view illustrating a slip state of the input side member and the output side member of the power transmission apparatus for vehicle according to the first embodiment of the present invention.
Figure 2C:
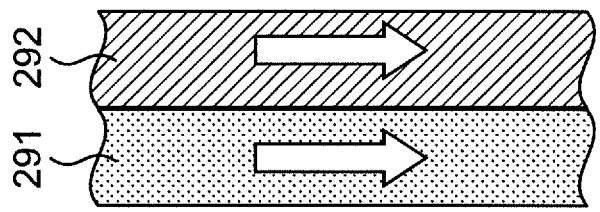
FIG. 2C is an explanatory view illustrating a closed state of the input side member and the output side member of the power transmission apparatus for vehicle according to the first embodiment of the present invention.

Initially defined is a state between an input side member 291 and an output side member 292 of each of the friction clutch 314 and the friction brake 315 in the forward-reverse switching mechanism, as a state common to the conventional art and the first embodiment. For example, each of the disks 341 and each of the driven plates 343 of the friction clutch 314 according to the first embodiment herein correspond to the input side member 291 and the output side member 292, respectively. FIGS. 2A, 2B, and 2C are views each illustrating speed transmission states between the input side member 291 and the output side member 292 of the forward-reverse switching mechanism in an opened state, a slip state, and a closed state of the input side member 291 and the output side member 292. More specifically, FIG. 2A illustrates a state of a clearance produced between the input side member 291 and the output side member 292. In this case, both the members do not contact each other, in which condition rotation force is not transmitted from the input side member 291 to the output side member 292. Accordingly, the output side member 292 does not rotate at all even when the input side member 291 rotates. FIG. 2B illustrates a state of slight contact between the input side member 291 and the output side member 292 with a slip produced therebetween. In this case, slight rotation force is transmitted from the input side member 291 to the output side member 292. Accordingly, the output side member 292 rotates at a rotation speed lower than a rotation speed of the input side member 291. FIG. 2C illustrates a state of complete contact between the input side member 291 and the output side member 292 without clearance therebetween. In this case, substantially entire rotation force is transmitted from the input side member 291 to the output side member 292. Accordingly, the output side member 292 and the input side member 291 rotate integrally at the same rotation speed.

Figure 3A:
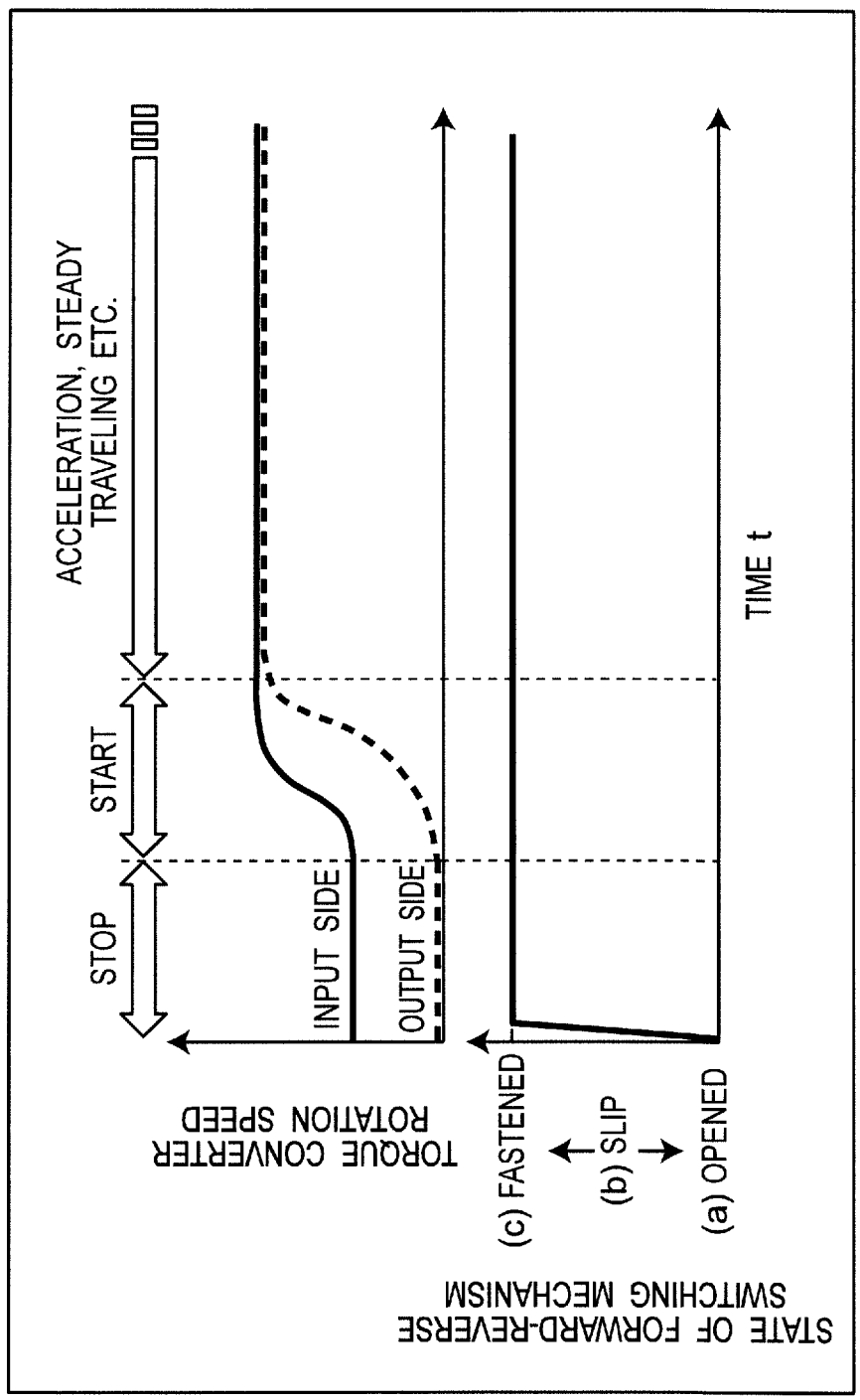
FIG. 3A is a chart illustrating an operation state of a forward-reverse switching mechanism of a conventional art at a start or other occasions.

FIG. 3A is a chart illustrating an operation state at a start or other occasions in the forward-reverse switching mechanism according to the conventional art. An upper part of the chart is a graph showing a relationship between times and rotation speeds of a torque converter presented by way of example of a start device, while a lower part of the chart is a graph showing a relationship between times and states of the conventional forward-reverse switching mechanism without a function of a vehicle start clutch. In this case, the state of the conventional forward-reverse switching mechanism changes from an opened state, via a slip state, and instantly to a closed state within a short time after a start of a vehicle stop period, as illustrated in the lower part of the chart. Thereafter, the closed state continues in remaining respective periods such as a vehicle stop period, a start period, an acceleration period, and a steady traveling period as long as reverse switching is absent. In this case, rotation is not transmitted from the input side to the output side of the torque converter in the vehicle stop period as illustrated in the upper part in the chart. Accordingly, the rotation speed of the input side of the torque converter is kept constant, while the rotation speed of the output side of the torque converter is maintained at zero. In the start period, transmission of the rotation force is initiated from the input side to the output side of the torque converter. Accordingly, the rotation speed of the output side gradually increases in accordance with gradual increase in the rotation speed of the input side of the torque converter. At a final stage of the start period, the rotation speed of the input side and the rotation speed of the output side become substantially equivalent to each other. In the periods such as the acceleration period and the steady traveling period, entire rotation force is transmitted from the input side to the output side of the torque converter. Accordingly, the equalized state of the rotation speed of the input side of the torque converter and the rotation speed of the output side of the torque converter is maintained.

Figure 3B:
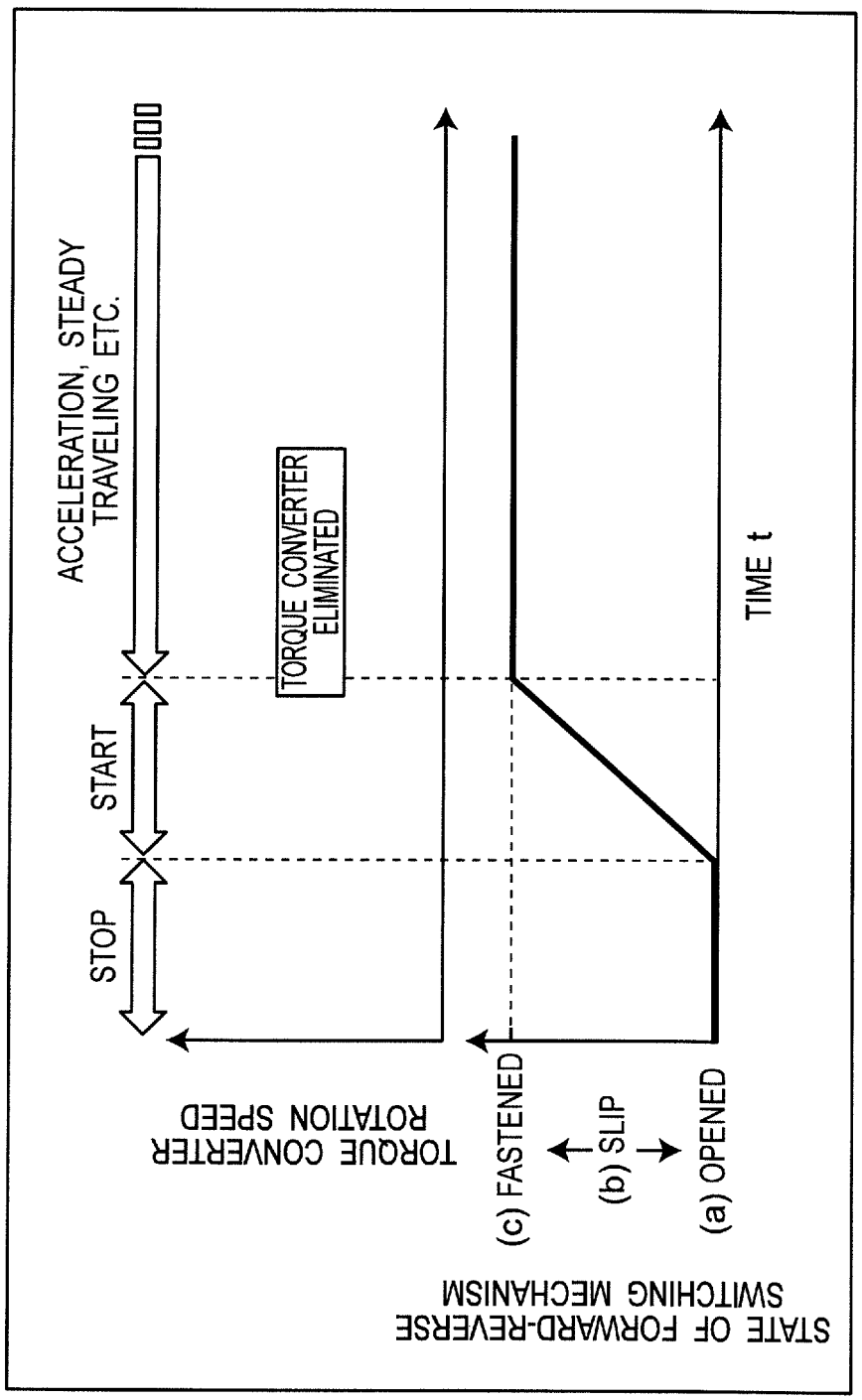
FIG. 3B is a chart illustrating an operation state of the power transmission apparatus for vehicle according to the first embodiment of the present invention at a start or other occasions.
Figure 5:
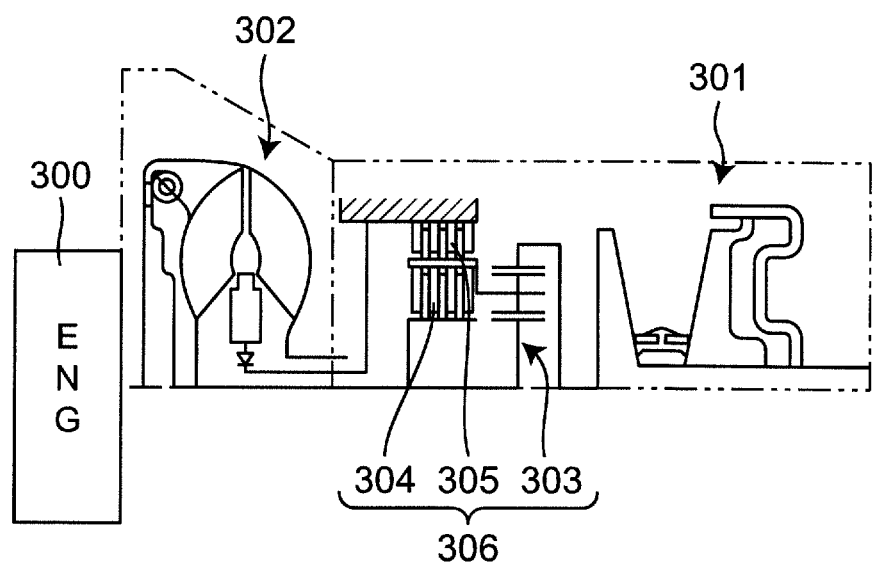
FIG. 5 is a schematic configuration view of the conventional art referred to for describing the first embodiment of the present invention.

Aside from the operation of the power transmission apparatus for vehicle according to the conventional art, a chart in FIG. 3B illustrates an operation state of the power transmission apparatus for vehicle at a start according to the first embodiment of the present invention. In the first embodiment, a start device such as a torque converter is eliminated, wherefore a graph in an upper part showing a relationship between times and rotation speeds of a torque converter is not presented. On the other hand, a lower part of the chart is a graph illustrating a relationship between times and states of the forward-reverse switching mechanism 312 with a function of a vehicle start clutch according to the first embodiment.

As illustrated in the lower part of the chart, the opened state is only maintained in the vehicle stop period, for example. In the start period, the respective input side members 291 and the respective output side members 292 shift to gradually approach and contact each other in a direct proportional manner with an elapse of time such that the opened state changes to the closed state via the slip state within a time length from a start to an end of the start period. In this case, the operation at a start is completely different from that of the forward-reverse switching mechanism of the conventional art. The control mechanism 316 performs closing control of the friction clutch 314 to change the opened state to the closed state in this manner and thereby perform the function of the vehicle start clutch. According to an example illustrated in FIG. 1, as will be described below, each of the input side members 291 in FIGS. 2A to 2C includes the annular disk 341 for the friction clutch 314, while each of the output side members 292 includes an annular driven plate 343 for the friction clutch 314. The control mechanism 316 achieves contact and separation of the annular driven plates 343 each corresponding to the output side member 292 to and from the annular disks 341 each corresponding to the input side member 291. The friction clutch 314 maintains the closed state in subsequent periods such as acceleration period and steady traveling period.

The forward-reverse switching mechanism 312 is capable of switching the rotation direction of the output side member 292 with respect to the input side member 291 by switching two states of:

(1) a stopping state of a pinion carrier 322 of the planetary gear 313; and (2) a synchronous rotation state of three elements (sun gear 317, pinion carrier 322, and ring gear 319) of the planetary gear 313.

In this case, an action for "stopping" the pinion carrier 322 in the state (1) is performed by the friction brake 315. On the other hand, an action for "synchronously rotating" the three elements in the state (2) is performed by the friction clutch 314.

Examples of possible use of the forward-reverse switching mechanism 312 when the transmission 311 is a continuously variable transmission (CVT) include two types: a mechanism which utilizes a state of rotations of the input side member and the output side member in the same direction as forward movement of the vehicle; and a mechanism which utilizes a state of rotations of the input side member and the output side member in the reverse directions as forward movement of the vehicle. The first embodiment is applicable to both of these types. In a more specific actual example, a start of forward or reverse movement is realizable by state transitions of the corresponding elements (friction clutch 314 and friction brake 315) from the opened state to the slip state and the closed state as illustrated in Table 1 in accordance with these two types and the forward or reverse movement.

TABLE 1

| | forward-reverse switching mechanism | | | | vehicle |
|---|---|---|---|---|---|
| | input | output | clutch | brake | state |
| type 1 | normal rotation | normal rotation | closed | opened | forward movement |
| | | reverse rotation | opened | closed | reverse movement |
| type 2 | normal rotation | reverse rotation | opened | closed | forward movement |
| | | normal rotation | closed | opened | reverse movement |

As apparent from above, the forward-reverse switching mechanism 312 according to the first embodiment is characterized by achieving an operation considerably different from that operation of the forward-reverse switching mechanism of the conventional art at a start.

Furthermore, the function of the vehicle start clutch is added to the forward-reverse switching mechanism to constitute the forward-reverse switching mechanism with start function 312 such that transmittable capacities of the friction clutch 314 and the friction brake 315 of the forward-reverse switching mechanism with start function 312 become larger than capacities of a friction clutch and a friction brake dedicated for the conventional forward-reverse switching mechanism without start function. Specific examples of methods for increasing the capacities include increase in contact areas of the clutch 314 and the brake 315, change of friction material, increase in the number of friction surfaces, increase in pressing force, and a combination of a plurality of these methods. Concerning increase in the capacities of the clutch 314 and/or the brake 315, the friction clutch 314 and the friction brake 315 of the power transmission apparatus for vehicle according to the first embodiment of the present invention are given a function of additionally absorbing energy corresponding to energy absorbed by the torque converter of the conventional art at a start, i.e., energy synchronized with a revolution speed of an engine as inertia of the vehicle. Accordingly, the capacities of the clutch 314 and/or the brake 315 need to be raised in accordance with the added absorbing function.

Meanwhile, as illustrated in FIG. 1, the planetary gear 313 includes a sun gear 317, a pinion gear 318, a ring gear 319, and a pinion carrier 322, and has sun gear input defined by the sun gear 317 and an input shaft 320 connected to the sun gear 317, and ring gear output defined by the ring gear 319 and an, output shaft 321 connected to the ring gear 319. The sun gear 317 engages with the pinion gear 318. The pinion gear 318 engages with the ring gear 319. The pinion carrier 322 is capable of regulating the pinion gear 318.

The friction clutch 314 regulates relative rotations of the pinion carrier 322 and the sun gear 317 (i.e., input side member 340) of the planetary gear 313, while the friction brake 315 regulates relative rotations of the pinion carrier 322 (i.e., output side member 342) of the planetary gear 313 and a fixed end (case) 325 of the transmission 311. More specifically, as illustrated in FIG. 1, the friction clutch 314 and the friction brake 315 have following configurations to connect the output side member 342 to the pinion carrier 322.

The input side member 340 is connected to the input shaft 320 rotating in accordance with driving of an internal combustion engine, such as an engine 331, while the sun gear 317 of the planetary gear 313 is connected on the downstream side of the input side member 340.

The annular disks 341 for the friction clutch 314 are connected to an outer surface of the input side member 340. The output side member (e.g., driving ring) 342, whose rotation axis is disposed concentrically with the input side member 340, includes on the inner surface side thereof the annular driven plates 343 for the friction clutch 314 facing the disks 341. The output side member 342 is restricted in the rotation direction of the input shaft 320. The annular disks 344 for the friction brake 315 are connected to the outer surface side of the output side member 342. The annular driven plates 345 for the friction brake 315 are connected to the inner circumferential surface of the case (fixed end) 325 of the power transmission apparatus for vehicle at positions facing the annular disks 344. Note that the driven plates 345 are restricted in the rotation direction with respect to the fixed end 520, but are movable in the axial direction of the input shaft 320. In this manner, the annular disks 341 for the friction clutch 314 and the annular driven plates 343 for the friction clutch 314 are alternately disposed with a clearance left between each other. In addition, the annular disks 344 for the friction brake 315 and the annular driven plates 345 for the friction brake 315 are alternately disposed with a clearance left between each other. Accordingly, the disks 341 and the drive plates 343 disposed adjacent to each other for the friction clutch 314 are allowed to contact with each other with pressure or separate from each other to achieve relative rotation regulation by axial forward or backward movement using a hydraulic piston or an electric actuator, for example, under the closing control by the control mechanism 316. Simultaneously, the disks 344 and the annular driven plates 345 disposed adjacent to each other for the friction brake 315 are similarly allowed to contact with each other with pressure or separate from each other to achieve relative rotation regulation. Note that the disks 344 and the driven plates 345 for the friction brake 315 are allowed to achieve forward and backward movement in the axial direction, while the driving ring 342 is restricted in the axial direction.

Moreover, the output side member 342 is connected to the pinion carrier 322. In this case, the disks 341 and the driven plates 343 disposed adjacent to each other in the friction clutch 314 are allowed to relatively contact with each other with pressure or separate from each other under the closing control of the control mechanism 316 to achieve transmission or cancellation of transmission of rotation force. In addition, the disks 344 and the annular driven plates 345 disposed adjacent to each other in the friction brake 315 are allowed to relatively contact with each other with pressure or separate from each other under the closing control of the control mechanism 316 to achieve transmission or cancellation of transmission of rotation force.

The forward-reverse switching mechanism with start function 312 configured as above is disposed between the transmission 311, and the engine 331 and a damper 332 to substitute for a conventional component functioning as a start device in a transmission. The start device herein is a torque converter or a friction clutch, for example. The damper 332 is a damper provided for transmitting torque of the engine 331, and absorbing and isolating torsional vibration.

The power transmission apparatus for vehicle in this embodiment may further include an electric motor 330 disposed on the downstream side of the engine 331 and the clutch 314 to constitute a hybrid system. A stator 330a of the electric motor 330 is fixed to a case 325, while a rotor 330b thereof including a rotation shaft parallel to the input shaft 320 is connected to a first output shaft 321. The rotor 330b is further connected to the transmission 311 via a second output shaft 350.

When the transmission 311 herein is a manual transmission, the transmission 311 may be configured by gear pairs with parallel axes.

When the transmission 311 is an automatic transmission, the transmission 311 may be configured by a plurality of planetary gears.

When the transmission 311 is a CVT, the transmission 311 may be configured by a pair of pulleys 311b (only one of pulleys 311b is shown, and the other pulley is not shown) capable of adjusting a distance between opposed sheave surfaces 311a, and a band-shaped member 311c such as a belt or a chain laid between the pair of pulleys 311b.

According to the first embodiment, the functions of the start device and the forward-reverse switching mechanism conventionally configured by different components are integrated into one apparatus. Accordingly, space saving and cost reduction are achievable. In this case, burnout of friction material caused by a slip at a start is avoidable by increasing the capacities of the friction clutch and the friction brake. Moreover, improvement of fuel consumption of the vehicle is achievable by utilizing a space produced by eliminating an existing start device and positioning the electric motor 330 in this space for hybridization of a power source. Furthermore, for hybridization of the power source, separation of the internal combustion engine from a power transmission path is allowed during driving and regeneration by the single electric motor by positioning the electric motor 330 on the downstream side of the forward-reverse switching mechanism 312. In this case, kinetic energy is more efficiently recoverable.

Note that the planetary gear 313 in a modified example may have ring gear input defined by the ring gear 319 and the input shaft 320 connected to the ring gear 319, and sun gear output defined by the sun gear 317 and the output shaft 321 connected to the sun gear 317, as illustrated in FIG. 4A.

According to this modified example, effects similar to the effects produced in the first embodiment can be obtained.

Moreover, as illustrated in FIG. 4B, the friction clutch 314 in a different modified example may be configured to regulate relative rotations of the ring gear 319 and the sun gear 317 of the planetary gear 313.

According to this modified example, closing control of the friction clutch 314 is similarly achieved by the control mechanism 316, wherefore effects similar to the effects produced in the first embodiment can be obtained.

Second Embodiment

A stacking thickness variable rotating electrical machine according to a second embodiment of the present invention relates to a motor adopted when a starting device is replaced with a motor equipped with clutch. This motor is described below in detail as the one for a vehicle as an example. However, the motor described herein has a wide and general range of applicability as well as applicability to a vehicle.

The stacking thickness variable rotating electrical machine herein is included in a permanent magnet synchronous rotating electrical machine, and is capable of adjusting an armature interlinkage magnetic flux, and driving in a wide range of from a lower speed to a higher speed by varying an effective stacking thickness.

Examples of proposed methods for improving a driving range of a permanent magnet synchronous rotating electrical machine include a technology which varies the number of turns for a lower speed and the number of turns for a higher speed (Patent Literature 1: JP 6-205573 A), and a technology which varies magnetic coercive force (Patent Literature 2: JP 2006-280195 A).

However, these technologies achieve only electric variability, and do not produce mechanical variability.

The second embodiment according to the present invention provides a permanent magnet synchronous rotating electrical machine capable of improving a driving range of the permanent magnet synchronous rotating electrical machine at any rotation speed.

Figure 6:
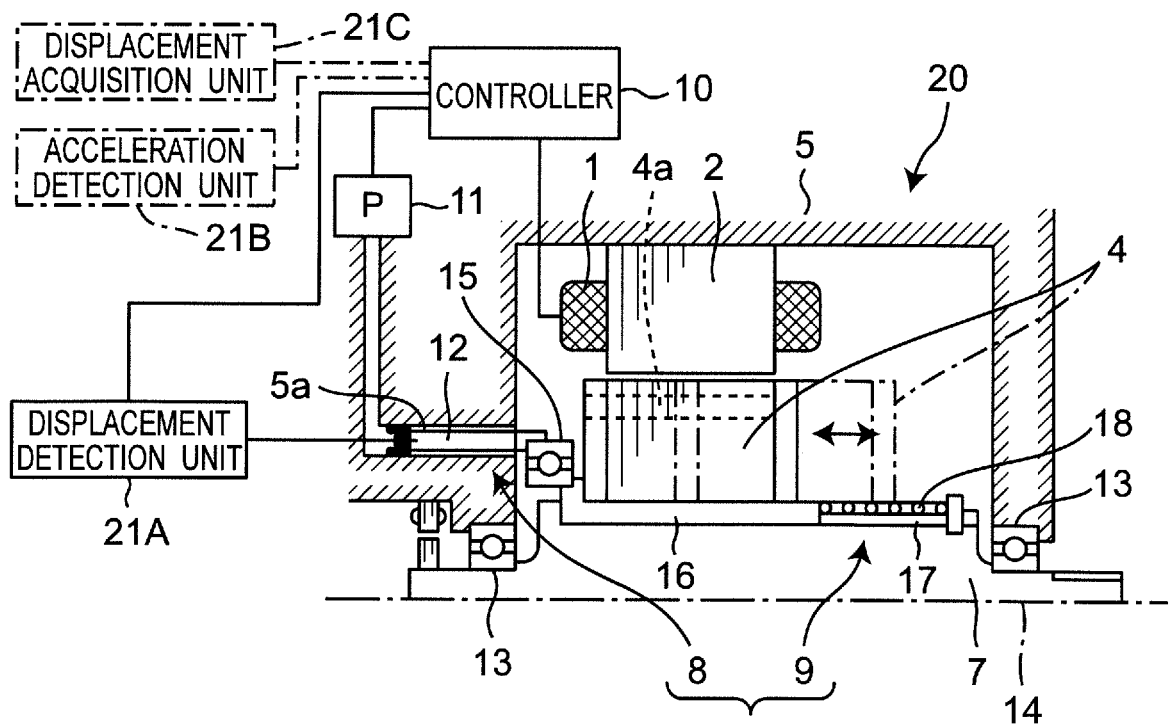
FIG. 6 is a cross-sectional view of a stacking thickness variable rotating electrical machine according to a second embodiment of the present invention.

As illustrated in FIG. 6, a stacking thickness variable rotating electrical machine 20 according to the second embodiment includes a stator 2, a rotor 4, and a stacking thickness variable mechanism 6.

The stator 2 includes an armature winding 1.

The rotor 4 is attached so as to be freely rotatable relative to the stator 2 and fixed to a rotation shaft 7, and includes a permanent magnet 4a inside the rotor 4.

A case 5 of the rotating electrical machine 20 holds the stator 2 and the rotor 4. The stator 2 is fixed to the case 5. The rotation shaft 7 to which the rotor 4 is fixed is held by a plurality of bearings 13 so as to be freely rotatable relative to the case 5. The rotor 4 and the rotation shaft 7 rotate in synchronization with each other.

The stacking thickness variable mechanism 6 is disposed on the case 5, and shifts the stator 2 and the rotor 4 relative to each other along a rotation center axis 14 of the rotor 4 in accordance with a rotation speed of the rotor 4.

For example, the stacking thickness variable mechanism 6 may include a pressing force generating mechanism 8 and a reaction force generating mechanism 9.

The pressing force generating mechanism 8 is connected so as to be freely rotatable relative to the rotor 4, and applies pressing force along the rotation center axis 14 of the rotation shaft 7 to which the rotor 4 is fixed. The pressing force generating mechanism 8, as a specific example, includes a hydraulic pump 11, a piston 12 projected from a piston fitting hole 5a of the case 5 under oil pressure applied from the hydraulic pump 11, and a bearing 15 disposed between the piston 12 and the rotor 4. The rotor 4 is fixed to a slider 16 which slides relative to a rail (e.g., protrusion portion of spline) 17 extending along the rotation center axis 14 of the rotation shaft 7. The bearing 15 is disposed between a tip portion (right end portion in FIG. 6) of the piston 12 and one of end portions (left end portion in FIG. 6) of the slider 16, and allows the rotor 4 to smoothly rotate while preventing blocking of the rotation of the rotor 4 by the piston 12. While oil pressure is used in this embodiment, air pressure may be employed in another configuration.

The reaction force generating mechanism 9 is disposed on the side of the rotor 4 opposite to the pressing force generating mechanism 8 with the rotor 4 interposed between the reaction force generating mechanism 9 and the pressing force generating mechanism 8. The reaction force generating mechanism 9 generates reaction force in the direction opposite to the direction of the pressing force acting along the rotation center axis 14. More specifically, the reaction force generating mechanism 9 includes a spring 18 compressed between the other end portion (right end portion in FIG. 6) of the slider 16 and an end portion (right end portion in FIG. 6) of the rail 17. The urging force of the spring 18 constantly presses the other end portion of the slider 16 toward the piston with respect to the end portion of the rail 17.

A controller 10 calculates a rotation speed of the rotor 4, i.e., the rotation shaft 7 based on information about current flowing in the armature winding 1 of the stator 2 or an angle detected by a resolver, for example, and starts driving of the stacking thickness variable mechanism 6 when the calculated rotation speed of the rotor 4, i.e., the rotor shaft 7 reaches a predetermined threshold. The predetermined threshold herein may be any value selected from a value of the boundary between a low rotation speed and a high rotation speed, any value of low rotation speed, and any value of high rotation speed. The start of driving of the stacking thickness variable mechanism 6 is specifically achieved by a shift of the rotor 4 while resisting the urging force of the spring 18 by a press of the piston 12 against the rotor 4 via the slider 16 along the rotation center axis 14 with respect to the rotation shaft 7, in accordance with movement of the piston 12 to project from the piston fitting hole 5a of the case 5 by an operation of the hydraulic pump 11. It is assumed, for example, that a shift amount corresponding to approximately the half axial length of the rotor 4 is the maximum shift amount. When the driving of the stacking thickness variable mechanism 6 stops, the operation of the hydraulic pump 11 stops accordingly. In this case, pressing force applied to the piston 12 is canceled, wherefore the urging force of the spring 18 shifts the rotor 4 via the slider 16 in the opposite direction along the rotation center axis 14 with respect to the rotation shaft 7. In this manner, the stacking thicknesses of the stator 2 and the rotor 4 are allowed to vary. At the time of position control to position the rotor 4 at any position along the rotation center axis 14, vehicle acceleration detected by a vehicle acceleration detector 21B is inputted to the controller 10. In this case, the controller 10 detects torque based on the vehicle acceleration and determines whether or not an appropriate shift has been achieved. Alternatively, a displacement amount detected by a displacement detector 21A is inputted to the controller 10 to determine whether or not an appropriate shift has been achieved. Instead, a displacement amount acquired by a displacement acquisition unit 21C, such as a high-order controller, may be inputted to the controller 10 to determine whether or not an appropriate shift has been achieved.

Accordingly, the pressing force generating mechanism 8 does not operate during low-speed rotation, for example. In this case, the rotor 4 and the stator 2 are located at the same position in the rotation axis direction. As a result, the effective stacking thickness becomes the maximum, wherefore the armature interlinkage magnetic flux becomes the maximum. Accordingly, a characteristic of low speed rotation and high torque is exhibited.

During high-speed rotation, the pressing force generating mechanism 8 operates and shifts the rotor 4 and the stator 3 relatively to each other in the rotation axis direction. In this case, the effective stacking thickness decreases, wherefore the armature interlinkage magnetic flux is allowed to decrease. As a result, a characteristic of high speed rotation and low torque is exhibited.

Figure 8:
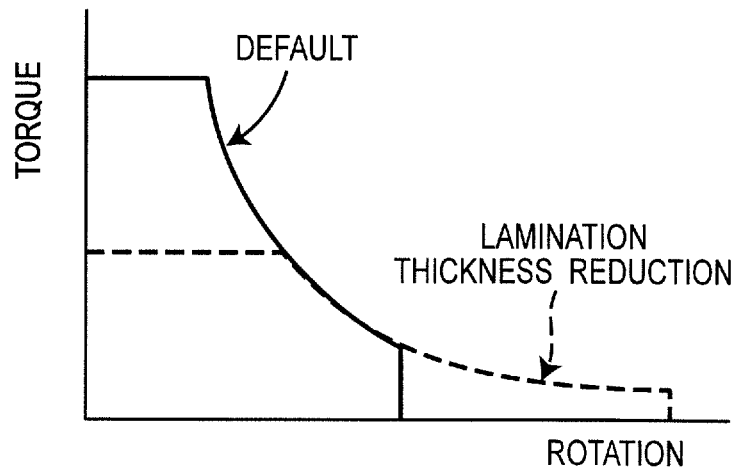
FIG. 8 is a chart illustrating a relationship between torques and rotation speeds of the stacking thickness variable rotating electrical machine according to the second embodiment of the present invention.

In a graph illustrated in FIG. 8, the horizontal axis represents a rotation speed, while the vertical axis represents torque. A solid line in this graph represents a characteristic in a state that the rotor 4 and the stator 2 are located at the same position. A broken line represents a characteristic in a state that the rotor 4 and the stator 2 are relatively shifted and produce positional deviation.

According to the second embodiment described herein, the stacking thickness variable mechanism 6 is operated during driving of the vehicle to allow a wide driving range of torque or a rotation speed of the rotating electrical machine (motor).

Note that the spring 18, i.e., the reaction force generating mechanism 9 of the stacking thickness variable mechanism 6 may be eliminated in the second embodiment. For example, the stacking thickness variable mechanism 6 may be connected so as to be freely rotatable relative to the rotor 4, and include a pressing and pulling mechanism which shifts the stator 2 and the rotor 4 forward and backward relatively to each other along the rotation center axis 14 of the rotor 4. For example, this pressing and pulling mechanism may be an electromagnetic solenoid.

Moreover, the stacking thickness variable mechanism 6 is not limited to a single unit. A plurality of the stacking thickness variable mechanisms 6 may be disposed around the rotation center axis 14.

Furthermore, when engagement between the stacking thickness variable mechanism 6 and the rotation shaft 7 is achieved by spline, smooth movement with torque transmission is difficult to produce under generation of friction. Accordingly, output may be instantaneously or intermittently lowered, or may be set to zero. More specifically, the stacking thickness variable rotating electrical machine 20 incorporates, as the controller 10, an inverter which connects or cuts off motor output to constitute a permanent magnet synchronous rotating electrical machine driving system. A possible configuration of the system thus configured includes a configuration of linkage with the hydraulic pump 11 via the controller 10, for example. Lowering of output herein refers to lowering in an analog manner.

Figure 7:
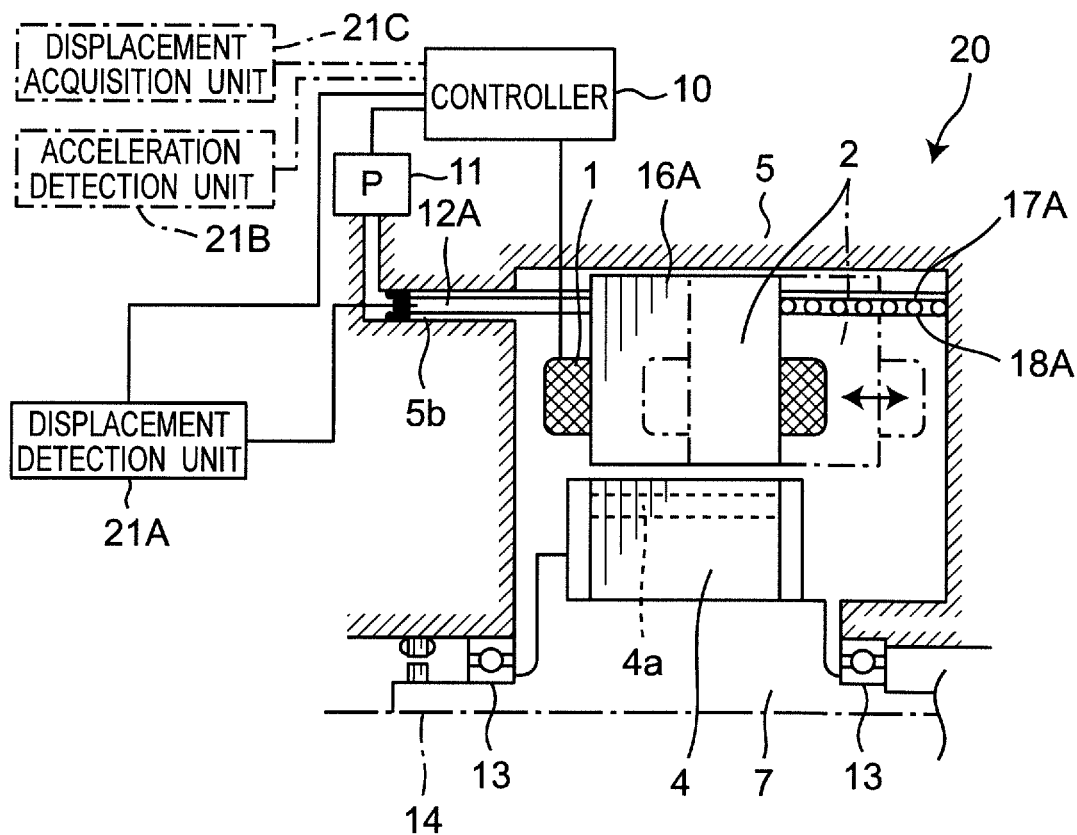
FIG. 7 is a cross-sectional view of a stacking thickness variable rotating electrical machine according to a modified example of the second embodiment of the present invention.

In addition, the stacking thickness variable mechanism 6 is not limited to a mechanism which shifts the rotor 4, but may be a mechanism connected to the stator 2 to shift the stator 2 along the rotation center axis 14 of the rotor 4 as illustrated in FIG. 7. In this case, the configuration of the stacking thickness variable mechanism 6 is similar to the corresponding configuration which shifts the rotor 4.

The stator 2 is fixed to a slider 16A which slides relatively to a rail 17A extending in the direction of the rotation center axis 14 of the rotation shaft 7. The rail 17A is fixed to the case 5.

The reaction force generating mechanism 9 includes a spring 18A compressed between the other end portion (right end portion in FIG. 6) of the slider 16A and an end portion (right end portion in FIG. 6) of the rail 17A. Urging force of the spring 18A constantly presses the other end portion of the slider 16A toward the piston with respect to the end portion of the rail 17A.

Accordingly, the stator 2 is shifted while resisting the urging force of the spring 18A by a press of a piston 12A against the stator 2 via the slider 16A along the rotation center axis 14 with respect to the rotation shaft 7, in accordance with movement of the piston 12A to project from the piston fitting hole 5b of the case 5 by an operation of the hydraulic pump 11.

The start of driving of the stacking thickness variable mechanism 6 is specifically achieved by a shift of the stator 2 while resisting the urging force of the spring 18A by a press of the piston 12A against the stator 2 via the slider 16A along the rotation center axis 14 with respect to the rotation shaft 7, in accordance with movement of the piston 12A to project from the piston fitting hole 5b of the case 5 by an operation of the hydraulic pump 11. It is assumed, for example, that a shift amount corresponding to approximately the half axial length of the stator 2 is the maximum shift amount. When the driving of the stacking thickness variable mechanism 6 stops, the operation of the hydraulic pump 11 stops accordingly. In this case, pressing force applied to the piston 12A is canceled, wherefore the urging force of the spring 18A shifts the stator 2 via the slider 16A in the opposite direction along the rotation center axis 14. In this manner, the stacking thicknesses of the stator 2 and the rotor 4 are allowed to vary. This manner of the shift of the stator 2 does not block the rotation action, wherefore an entire configuration can be simplified.

Third Embodiment

Figure 9:
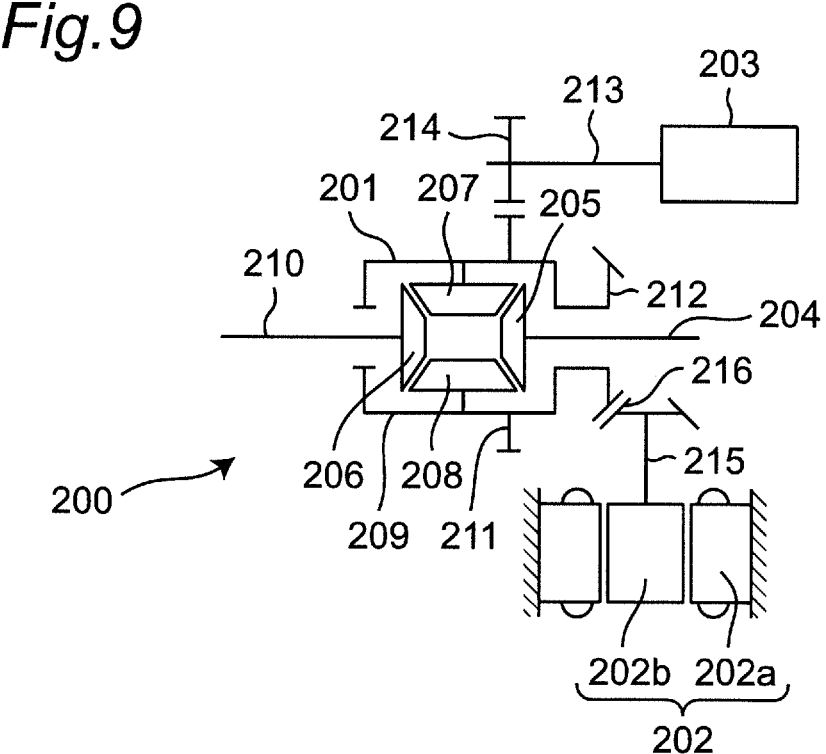
FIG. 9 is a schematic configuration view illustrating a driving apparatus for hybrid vehicle according to a third embodiment of the present invention.

As illustrated in FIG. 9, a driving apparatus for vehicle 200 according to a third embodiment of the present invention is configured by a hybrid system incorporated in a vehicle which includes a transverse-mounted transmission 203, i.e., a transmission 203 disposed such that the front-rear direction of the vehicle and a transmission shaft 213 of the transmission 203 cross each other at right angles. A power transmission path of an electric motor 202 included in this hybrid system is connected along an axis of a differential case 209 of a differential 201.

The differential 201 includes a first side gear 205 to which one end of a first drive shaft 204 is fixed, a second side gear 206 to which one end of a second drive shaft 210 is fixed, a first pinion gear 207, a second pinion gear 208, the differential case 209, and a ring gear 211. The first pinion gear 207 and the second pinion gear 208 engage with each of the first side gear 205 and the second side gear 206 in upper and lower parts in FIG. 9. The ring gear 211 rotatable around the center axis of the first drive shaft 204 and the second drive shaft 210 is fixed to the outside of the differential case 209 which supports the first pinion gear 207 and the second pinion gear 208 in such a manner that the first pinion gear 207 and the second pinion gear 208 are freely rotatable.

A transmission shaft 213 of the transmission 203 engages with the ring gear 211 of the differential case 209 of the differential 201 via a parallel gear 214.

A bevel gear 212 provided as an example of an orthogonal gear is fixed to an end portion on a first drive shaft 204 side at one end of the differential case 209. The differential case 209 and the bevel gear 212 rotate integrally.

The bevel gear 212 engages with a bevel gear 216 provided as one example of an orthogonal gear fixed to a rotation shaft 215 of the electric motor 202. Accordingly, the electric motor 202 is connected to the differential 201 via the bevel gear 216. In other words, the electric motor 202 is directly connected not to the drive shafts 204 and 210, but to the differential case 209 of the differential 201.

The electric motor 202 includes a stator 202a and a rotor 202b connected to the rotation shaft 215.

The bevel gear 216 further includes a straight bevel gear or a spiral bevel gear, a hypoid gear, and others.

The rotation shaft 215 of the electric motor 202 in FIG. 9 is disposed such that the drive shafts 204 and 210 of the differential 201 cross the transmission shaft 213 of the transmission 203 at right angles. The drive shafts 204 and 210 of the differential 201 and the transmission shaft 213 of the transmission 203 are disposed in parallel to each other.

According to the third embodiment, the electric motor 202 is connected not on the upstream side of the transmission 203, but at a position close to a tire on the downstream side of the transmission 203. Accordingly, driving and regeneration of the electric motor 202 are achievable while reducing transmission losses and increasing transmission efficiency. Moreover, addition of the electric motor 202 improves fuel consumption of the vehicle. Furthermore, the power transmission path of the electric motor 202 is connected to the axis of the differential case 209 of the differential 201. Accordingly, electrification of the vehicle is achievable without the necessity of a considerable change of an internal structure of an existing transmission.

Figure 10:
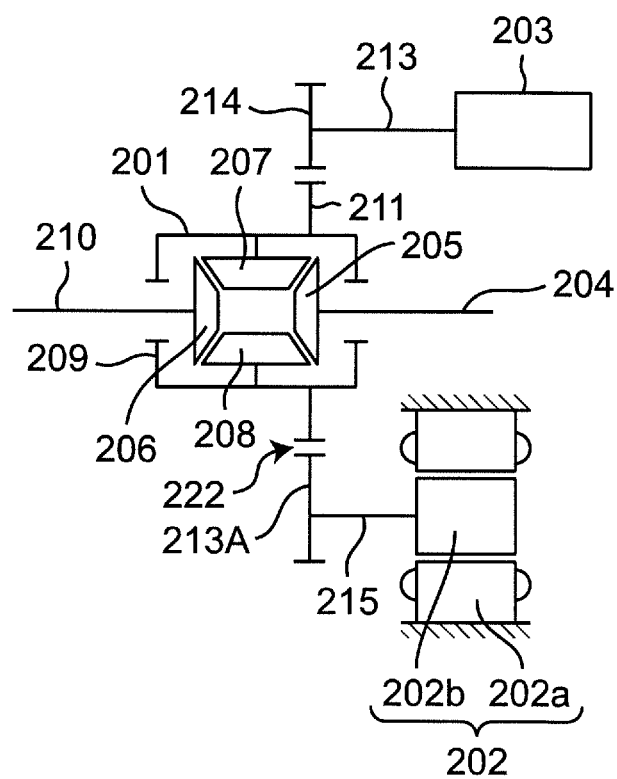
FIG. 10 is a schematic configuration view illustrating a driving apparatus for hybrid vehicle according to a modified example of the third embodiment of the present invention.

FIG. 10 is a schematic configuration view illustrating the driving apparatus for vehicle 200 according to a modified example of the third embodiment of the present invention.

This modified example is different from the third embodiment in a point of a connection mechanism between the differential 201 and the electric motor 202. Only the different point is mainly described, and identical parts are given identical reference numbers and not repeatedly described herein.

As illustrated in FIG. 10, the electric motor 202 may be connected to the differential 201 via a parallel gear 222. The parallel gear 222 includes a spur gear or a helical gear, and others. More specifically, the parallel gear 222 in FIG. 10 includes the ring gear 211 of the differential case 209 of the differential 201, and a parallel gear 213A connected to the rotation shaft 215 of the electric motor 202. The rotation shaft 215 of the electric motor 202, the drive shafts 204 and 210 of the differential 201, and the transmission shaft 213 of the transmission 203 are disposed in parallel to each other in FIG. 10.

Effects similar to the effects of the third embodiment can be obtained in the modified example of the third embodiment. Examples of effects peculiar to the modified example of the third embodiment include higher specific transmission efficiency of gear engagement than that of an orthogonal gear.

Fourth Embodiment

Figure 11:
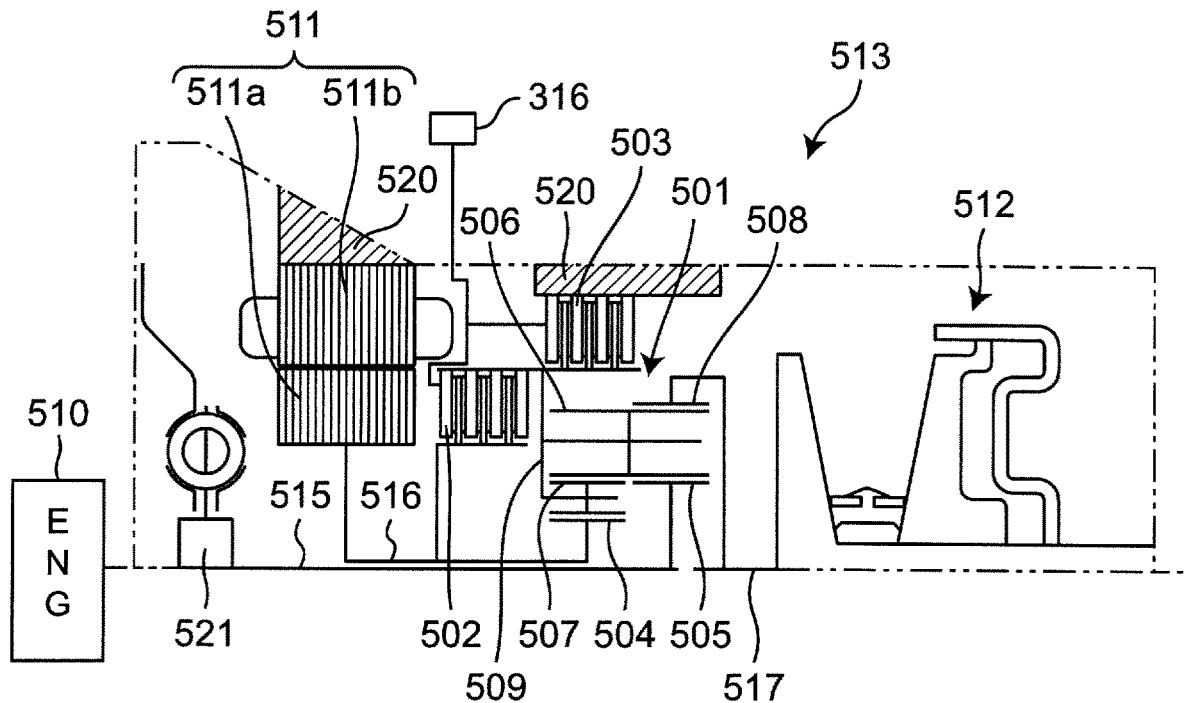
FIG. 11 is a schematic configuration view of a driving apparatus for vehicle according to a forth embodiment of the present invention.

As illustrated in FIG. 11, a driving apparatus for vehicle 513 according to a fourth embodiment of the present invention includes a Ravigneaux planetary gear 501, a friction clutch 502, and a friction brake 503. The driving apparatus for vehicle 513 includes input paths of two systems and an output path of one system for the Ravigneaux planetary gear 501, and achieves variable adjustment of output from the system by adjusting each input of the two systems;

Patent Literature 3: Japanese Patent No. 4660583 discloses a conventional art which combines a continuously variable transmission and a two-speed sub-transmission, and produces a discontinuous change of a speed reduction ratio at the time of switching between two stages of high and low speeds.

When a two-speed sub-transmission is combined with a continuously variable transmission as in the above conventional art, a discontinuous change of a speed reduction ratio is produced at the time of switching between high and low speeds. In this case, a speed change shock, or discomfort felt by a user due to a discontinuous change of acceleration may be caused at the time of absorption of a relative rotation speed difference.

According to the fourth embodiment, however, a variable sub-transmission is adopted instead of the two-speed sub-transmission to solve issue arising from the conventional art. This point is hereinafter detailed.

The Ravigneaux planetary gear 501 includes a first sun gear 504, a second sun gear 505, a first pinion gear 506, a second pinion gear 507, and a ring gear 508. The first sun gear 504 engages with the second pinion gear 507 and the first pinion gear 506 regulated by an identical pinion carrier 509. The second sun gear 505 engages with the first pinion gear 506. The first pinion gear 506 and the ring gear 508 engage with each other.

A first input path of the input paths of the two systems is connected to the second sun gear 505, while a second input path thereof is connected to the first sun gear 504. The output path of the one system is connected to the ring gear 508.

For example, the first input path of the input paths of the two systems in FIG. 11 includes a first output shaft 515 of an engine 510 provided as an example of an internal combustion engine, and the second sun gear 505 connected to the first output shaft 515. The second input path thereof includes a rotation shaft 516 integrally rotating with a rotor 511a of an electric motor 511, and the first sun gear 504 connected to the rotation shaft 516. A second output shaft 517 provided as the output path of the one system is connected to the ring gear 508.

The friction clutch 502 and the friction brake 503 are similarly connected to the rotation shaft 516 integrally rotating with the rotor 511a of the electric motor 511. Accordingly, the friction clutch 502 and the friction brake 503 are configured to achieve driving only by using the engine 510 even when electric input from the electric motor 511 becomes zero at the time of no supply of power from a battery.

Configurations of the friction clutch 502 and the friction brake 503 are similar to the structures of the friction clutch 314 and the friction brake 315 in FIG. 1.

The friction clutch 502 is configured to regulate relative rotations of any two elements selected from the first sun gear 504, the second sun gear 505, the pinion carrier 509, and the ring gear 508. The friction brake 503 is configured to regulate relative rotations of the pinion carrier 509 and a fixed end (case of driving apparatus for vehicle 513) 520.

The expression "to regulate" herein refers to any action selected from connection between components, disconnection between components, and sliding with contact between components (half-clutch).

Figure 12:
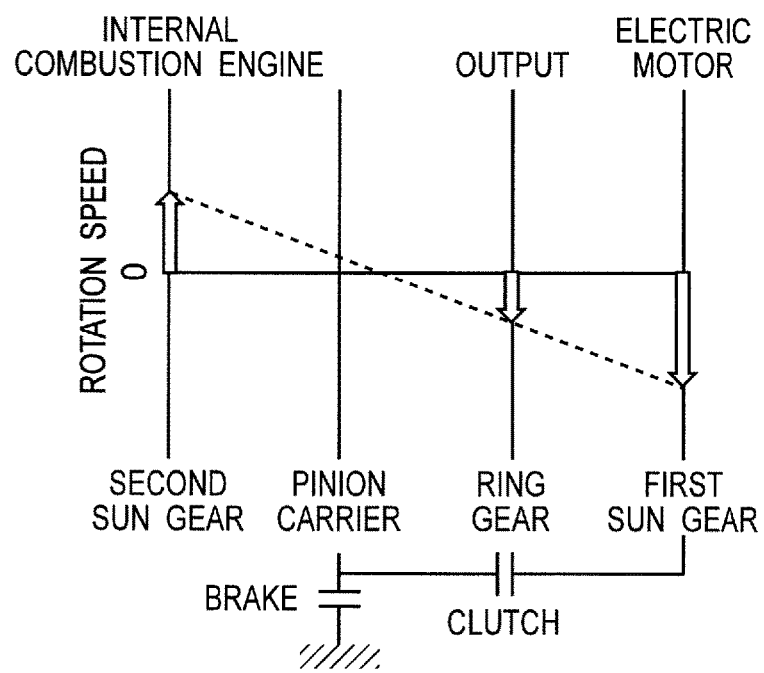
FIG. 12 is an alignment chart of an operation state (variable speed, reverse rotation) of the driving apparatus for vehicle according to the forth embodiment.
Figure 13:
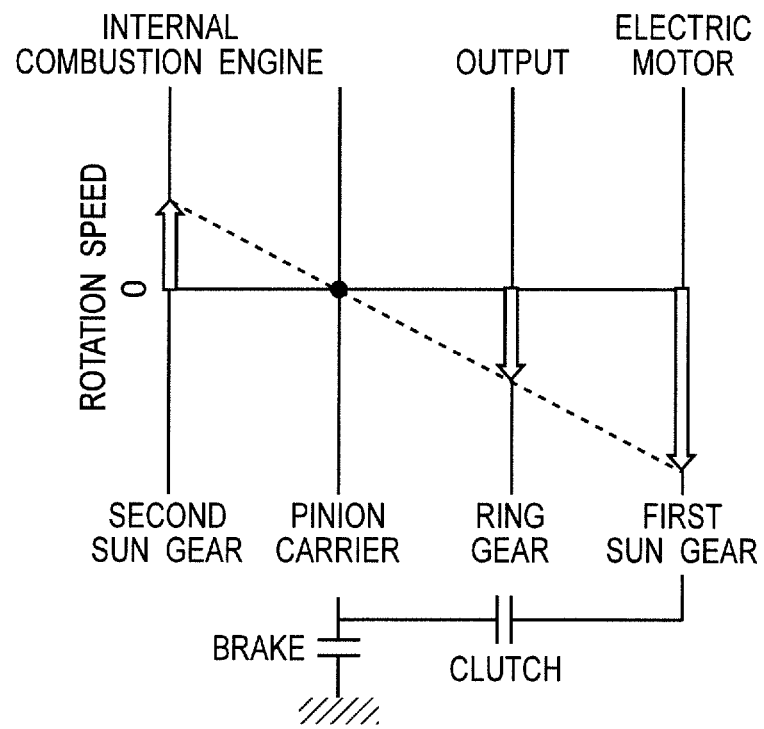
FIG. 13 is an alignment chart of an operation state (fixed reduction ratio, reverse rotation) of the driving apparatus for vehicle according to the forth embodiment.
Figure 14:
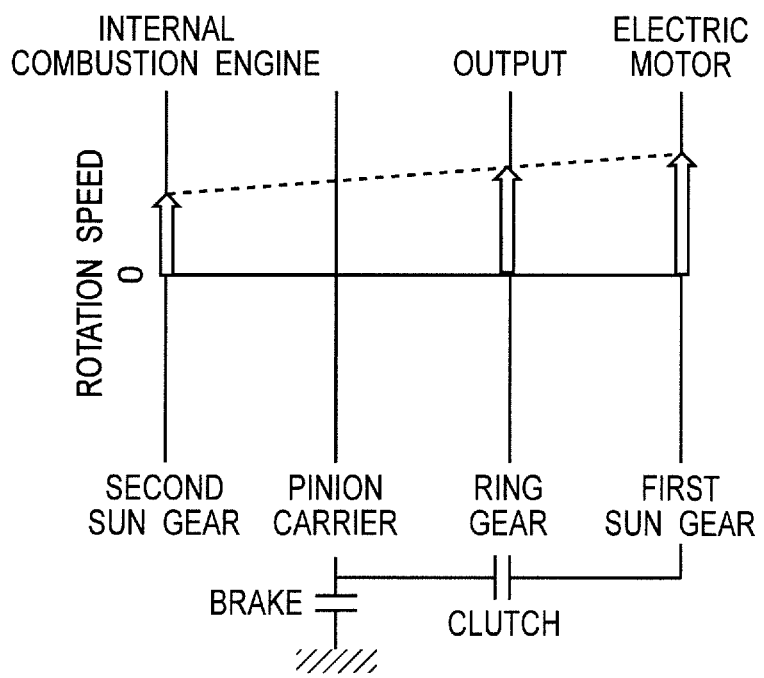
FIG. 14 is an alignment chart of an operation state (variable speed, normal rotation) of the driving apparatus for vehicle according to the forth embodiment.
Figure 15:
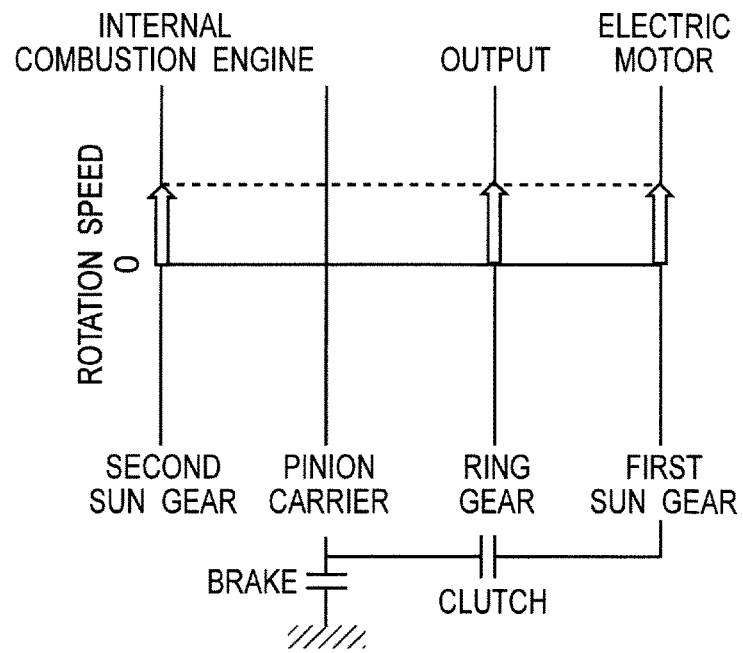
FIG. 15 is an alignment chart of an operation state (fixed reduction ratio, normal rotation) of the driving apparatus for vehicle according to the forth embodiment.

FIG. 12 is an alignment chart of operation states (variable speed, reverse rotation) of the driving apparatus for vehicle 513. FIG. 13 is an alignment chart of operation states (fixed reduction ratio, reverse rotation) of the driving apparatus for vehicle 513. FIG. 14 is an alignment chart of operation states (variable speed, normal rotation) of the driving apparatus for vehicle 513. FIG. 15 is an alignment chart of operation states (fixed reduction ratio, normal rotation) of the driving apparatus 513 for vehicle.

Each of FIGS. 12 to 15 herein is an alignment chart showing a mechanical relationship between rotation speeds and torques of respective rotation elements in the driving apparatus for vehicle 513. Four vertical lines in a horizontal-axis X direction in each of the alignment charts in FIGS. 12 to 15 represent gear ratio relationships of rotation elements, i.e., the second sun gear 505, the pinion carrier 509, the ring gear 508, and the first sun gear 504 of the Ravigneaux planetary gear 501 in this order from the left in the chart, respectively. Each of the four vertical lines indicates two-dimensional coordinates expressing a relative rotation speed in the vertical-axis Y direction. One dotted oblique line indicates rotation speeds, i.e., respective rotation speeds of the electric motor 511 and the engine 510 provided as an example of an internal combustion engine connected to the output shaft.

FIG. 12 shows a variable speed mode, where the second sun gear 505 (input) and the ring gear 508 (output) have a relationship of reversed rotation directions. In addition, a value of output from the ring gear 508 is adjustable by any speed reduction ratio obtained by adjusting the rotation speed of the electric motor 511 connected to the first sun gear 504 and the rotation speed of the engine 510 connected to the second sun gear 505 in a free state of the pinion carrier 509.

FIG. 13 shows a fixed speed reduction ratio mode, where the second sun gear 505 (input) and the ring gear 508 (output) have a relationship of reversed rotation directions. In addition, the speed reduction ratio is fixed when the rotation speed of the engine 510 connected to the second sun gear 505 is determined in a fixed state of the pinion carrier 509 by operation of the brake 503 connected to the pinion carrier 509. In this case, a rotation speed of the electric motor 511 connected to the first sun gear 504 and a value of output from the ring gear 508 are determined.

FIG. 14 shows a variable speed mode, where the second sun gear 505 (input) and the ring gear 508 (output) have a relationship of rotations in the same direction. In addition, when the rotation direction of the electric motor 511 connected to the first sun gear 504 is equalized with the rotation direction of the engine 510 connected to the second sun gear 505 in a free state of the pinion carrier 509, the rotation direction of output from the ring gear 508 is equalized. Moreover, a value of output from the ring gear 508 is adjustable by any speed reduction ratio obtained by adjusting the rotation speed of the electric motor 511 connected to the first sun gear 504 and the rotation speed of the engine 510 connected to the second sun gear 505.

FIG. 15 shows a fixed speed reduction ratio mode, where the second sun gear 505 (input) and the ring gear 508 (output) have a relationship of rotations in the same direction. In addition, the speed reduction rate is fixed to 1 by connection between the pinion carrier 509 and the first sun gear 504 via the clutch 502 connected to the pinion carrier 509. In this case, a rotation speed of the electric motor 511 connected to the first sun gear 504 and a value of output from the ring gear 508 are determined when the rotation speed of the engine 510 connected to the second sun gear 505 is determined.

According to the fourth embodiment, the driving apparatus for vehicle 513 functions as a variable sub-transmission when combined with the existing transmission 512. Accordingly, a transmission gear ratio range (ratio coverage) of the existing transmission 512 expands, wherefore traveling performance and fuel consumption of the vehicle improve. Moreover, the driving apparatus for vehicle 513 functioning as a variable sub-transmission achieves smooth operation. Furthermore, addition of the electric motor 511 improves fuel consumption of the vehicle. In addition, in comparison with the two-speed sub-transmission of Patent Literature 3, the variable sub-transmission provided according to the fourth embodiment is capable of reducing a speed change shock caused by a speed change of the sub-transmission, or discomfort felt by a user as a result of a discontinuous change of acceleration.

In a modified example of the fourth embodiment, the input paths of the two systems may be constituted by a first input path defined by connection between the second sun gear 505 and the electric motor 511, and a second input path defined by connection between the first sun gear 504 and the engine 510 provided as an example of an internal combustion engine to connect the friction brake to the ring gear, and connect output to the pinion carrier. According to this modified example, effects similar to the effects of the fourth embodiment can be obtained.

In a different modified example, the input paths of the two systems may be constituted by a first input path defined by connection between the second sun gear 505 and the electric motor 511 provided as a first electric motor, and a second input path defined by connection between the first sun gear 504 and a second electric motor. According to this different modified example, following effects can be obtained. Generally, an electric motor is required to use a range of small load and low efficiency when necessary driving force is small during driving of a vehicle. In this case, either the first electric motor or the second electric motor is used as an electric motor for driving, while the other of the first and second electric motors is used as a power generator, i.e., an electric motor for load. According to this configuration, the electric motor for driving is driven in a range of larger load and higher efficiency, while power exceeding driving force necessary for vehicle driving is generated by the other electric motor, and can be stored as electrical energy. The electrical energy stored herein can be used for subsequent vehicle driving. When necessary driving force for driving a vehicle is large in an opposite case, an electric motor is required to use a large load and low efficiency range. In this case, driving force is shared by the first electric motor and the second electric motor to lower each load of the electric motors and achieve driving in a high efficiency range.

In a further different modified example, an additional clutch may be provided between a torsional vibration damper 521 and the second sun gear 505 to allow separation of the engine 510. The damper 521 is a damper provided for transmitting torque of the engine 510, and absorbing and isolating torsional vibration. According to this different modified example, losses produced by corotation of the engine (friction and pumping loss) can be eliminated when the vehicle is driven only by the electric motor, or when kinetic energy of the vehicle is regenerated into electrical energy by the electric motor. Accordingly, a regeneration quantity improves.

Fifth Embodiment

A hybrid driving apparatus 620 according to a fifth embodiment of the present invention is incorporated in a vehicle equipped with an automatic transmission of a type which positions a forward-reverse switching mechanism on the upstream side of a transmission. The hybrid driving apparatus 620 allows input of motor output to an output side of the forward-reverse switching mechanism to thereby provide a hybrid function by a small range of remodeling and improve fuel consumption of the vehicle.

Conventionally, Patent Literature 4: JP 2013-16642 A proposes a method for adding a motor to a continuously variable transmission to constitute a hybrid driving apparatus. According to this method, the motor is disposed on the side opposite to an engine with respect to a pulley of the continuously variable transmission, and disposed coaxially with a rotation shaft of an engine.

According to the foregoing method, however, an entire length of the transmission increases by the length of a motor shaft. This method is therefore difficult to apply to a compact vehicle.

The fifth embodiment is developed to solve this issue.

Figure 16:
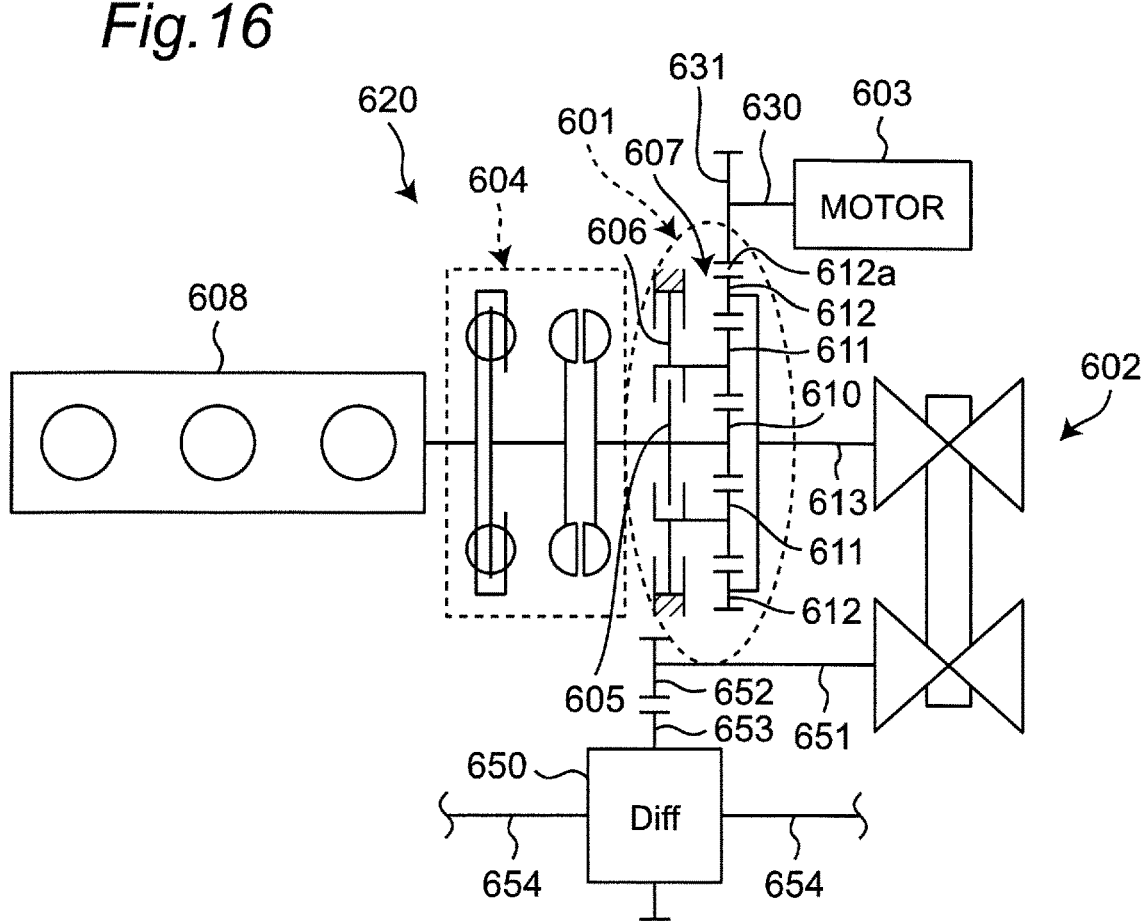
FIG. 16 is a schematic configuration view of a driving apparatus for vehicle according to a fifth embodiment of the present invention.
Figure 17:
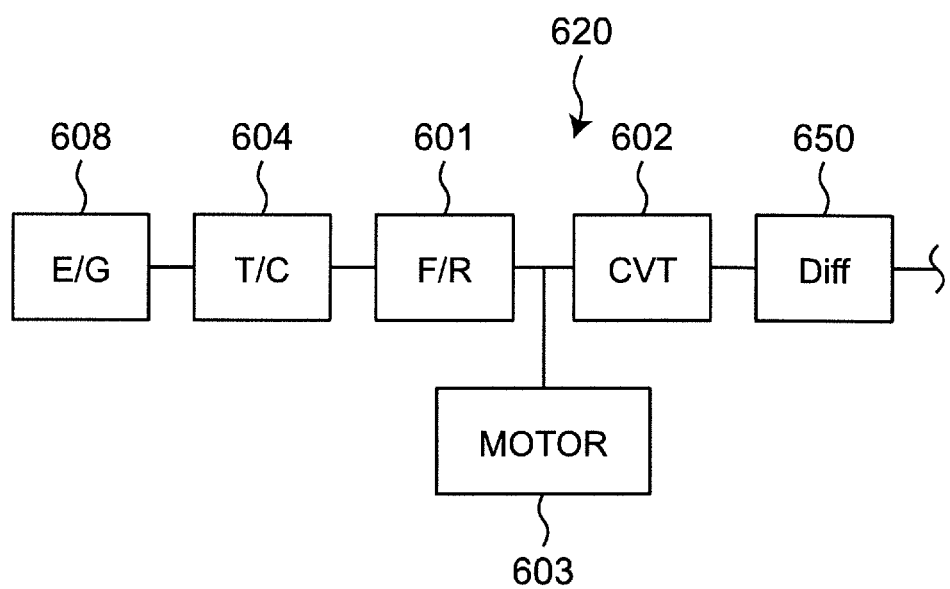
FIG. 17 is a power path block diagram of the driving apparatus for vehicle according to the fifth embodiment.

As illustrated in FIGS. 16 and 17, a hybrid driving apparatus 620 according to the fifth embodiment includes a forward-reverse switching mechanism (F/R) 601, a transmission (e.g., CVT) 602, an input path on the output side of the forward-reverse switching mechanism 601, and a motor 603 connected to the input path. For example, the transmission 602 is configured by a CVT.

The forward-reverse switching mechanism 601 includes a friction clutch 605, a friction brake 606, and a planetary gear 607.

The planetary gear 607 includes a sun gear 610, a pinion gear 611 engaging with the sun gear 610, and a ring gear 612 engaging with the pinion gear 611.

Input from an engine (E/G) 608 is inputted to the sun gear 610 of the planetary gear 607 via a starting device (e.g., T/C as torque converter) 604. For example, the starting device 604 is a torque converter.

The friction clutch 605 is connected to the sun gear 610 and the pinion gear 611.

The friction brake 606 is connected to the pinion gear 611.

The ring gear 612 is connected to an input shaft 613 of the transmission 602.

A gear 612*a* is provided on an outer circumferential surface of the ring gear 612, and forms an input path. More specifically, the gear 612*a* on the outer circumferential surface of the ring gear 612 engages with a gear 631 fixed to the output shaft 630 of the motor 603. Torque of the motor 603 is inputted to the ring gear 612 corresponding to the output side of the forward-reverse switching mechanism 601.

Note that a gear 652 is fixed to an output shaft 651 extended from the transmission 602 in FIG. 16. The gear 652 engages with a gear 653 of a differential (Diff) 650. A pair of drive shafts 654 are connected to the differential 650.

According to the fifth embodiment, addition of the motor 603 can improve traveling performance and fuel consumption of the vehicle. More specifically, use of the motor 603 as auxiliary power in addition to engine power can reduce engine output. Moreover, the ring gear has outer teeth, while the motor has a different axis for input. Accordingly, electrification of the vehicle is realizable without the necessity of a considerable change of an internal structure of an existing transmission. Furthermore, torque from the motor 603 is inputted to the input side of the transmission. In this case, the motor 603 can expand an operation range by utilizing a transmission gear ratio of the transmission. Accordingly, fuel consumption of the vehicle improves. In addition, the clutch 605 and the brake 606 of the forward-reverse switching mechanism 601 can be opened to cut off output from the engine 608 at the time of deceleration of the vehicle. Accordingly, a regeneration energy quantity can be raised by eliminating engine friction losses.

In a modified example of the fifth embodiment, the input path of the forward-reverse switching mechanism 601 may be defined by a sprocket constituting the outer circumferential surface of the ring gear 612. In this case, the output shaft 630 of the motor 603 may be connected to the sprocket via a chain.

In a different modified example, the input path of the forward-reverse switching mechanism 601 may be disposed on a side surface of the ring gear 612, or on the input shaft 613 of the transmission 602.

Sixth Embodiment

A hybrid driving apparatus according to a sixth embodiment of the present invention is incorporated in a vehicle equipped with an automatic transmission. This hybrid driving apparatus adds a start clutch function to a forward-reverse switching mechanism, eliminates a conventional starting device such as a torque converter and a clutch, and positions a motor in a space where the conventional starting device is disposed to improve fuel consumption of the vehicle.

Conventionally, in case of a transverse-mounted transmission, for example, a motor disposed on an output shaft (e.g., secondary pulley shaft of CVT) of the transmission needs to be positioned between a drive shaft and an input shaft (e.g., primary pulley shaft of CVT) of the transmission. Accordingly, considerable limitations are imposed in the radial direction. Moreover, the motor disposed on the output shaft of the transmission needs to be provided together with a deceleration mechanism.

The hybrid driving apparatus provided according to the sixth embodiment of the present invention is capable of reducing these limitations, and allowed to be provided in a limited space.

Figure 18:
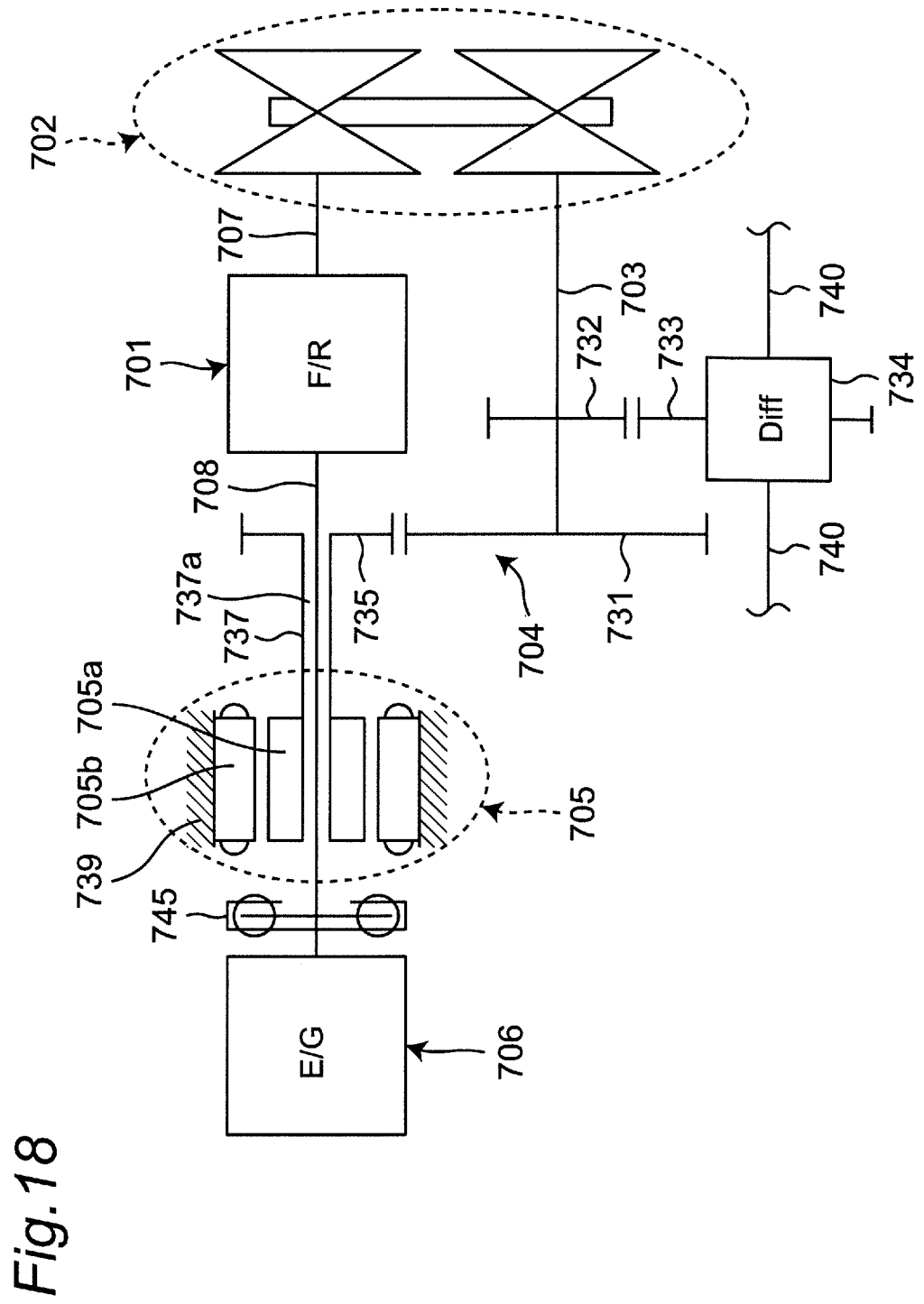
FIG. 18 is a schematic configuration view of a hybrid driving apparatus according to a sixth embodiment of the present invention.
Figure 19:
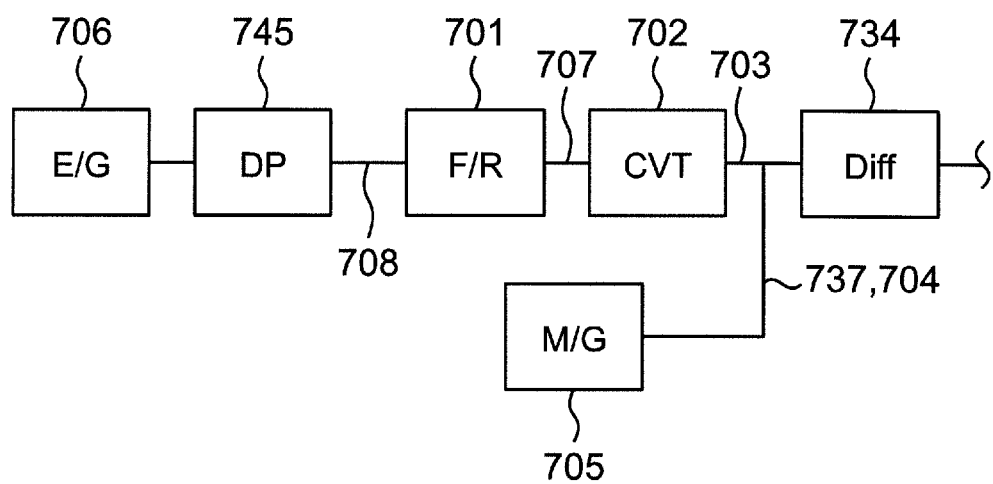
FIG. 19 is a power path block diagram of the hybrid driving apparatus according to the sixth embodiment.

FIG. 18 is a schematic configuration view of the hybrid driving apparatus according to the sixth embodiment. FIG. 19 is a power path block diagram of the hybrid driving apparatus according to the sixth embodiment.

As illustrated in FIGS. 18 and 19, the hybrid driving apparatus according to the sixth embodiment includes a forward-reverse switching mechanism 701, a transmission 702, and a motor 705 connected to an output shaft 703 of the transmission 702 via a gear 704. The motor 705 is disposed coaxially between the engine 706 and the transmission 702.

The forward-reverse switching mechanism 701 is configured by a friction clutch, a friction brake, and a planetary gear, similarly to the configuration in FIG. 16.

The planetary gear includes a sun gear, a pinion gear engaging with the sun gear, and a ring gear engaging with the pinion gear.

Input from the engine 706, i.e., an output shaft 708 of the engine 706 is inputted to the sun gear of the planetary gear.

The friction clutch is connected to the sun gear and the pinion gear.

The friction brake is connected to the pinion gear.

The ring gear is connected to an input shaft 707 of the transmission 702.

The friction clutch and the friction brake are a friction clutch and a friction brake to each of which a function of a vehicle start clutch is added, similarly to the friction clutch and the friction brake described in the first embodiment.

The gear 704 associated with connection between the output shaft 703 of the transmission 702 and the motor 705 has a following configuration, for example.

A large gear 731 and a small gear 732 are fixed to the output shaft 703. The small gear 732 is connected via a gear 733 to a differential 734 connected to a pair of drive shafts 740. The large gear 731 engages with a gear 735. A rotation shaft 737 to which the gear 735 is fixed is disposed coaxially with the output shaft 708 of the engine 706, and connected to a rotor 705*a* of the electric motor (motor) 705. The output shaft 708 of the engine 706 rotatably penetrates a through hole 737a of the rotation shaft 737. A stator 705b is fixed to a case 739 of the hybrid driving apparatus. A reference number 745 in FIG. 19 indicates an engine torsional vibration damper. The damper 745 is a damper provided for transmitting torque of the engine 706, and absorbing and isolating torsional vibration.

According to the sixth embodiment, the motor 705 is disposed coaxially with the input shaft 707 of the transmission 702 to reduce limitations in the radial direction of the motor 705. Moreover, the configuration that the rotation shaft 737 of the motor 705 is offset from the output shaft 703 of the transmission 702 can be utilized to constitute a deceleration mechanism by the gear 704 and the like. Accordingly, the hybrid driving apparatus is allowed to be provided in a limited space by positioning the motor 705 in a space where the conventional starting device is disposed. Moreover, the motor 705 is allowed to be used with high transmission efficiency without effects of transmission losses by connecting the motor 705 to the output side of the transmission 702. Moreover, addition of the motor 705 improves traveling performance and fuel consumption of the vehicle.

Modified examples of the sixth embodiment are hereinafter described.

Figure 20:
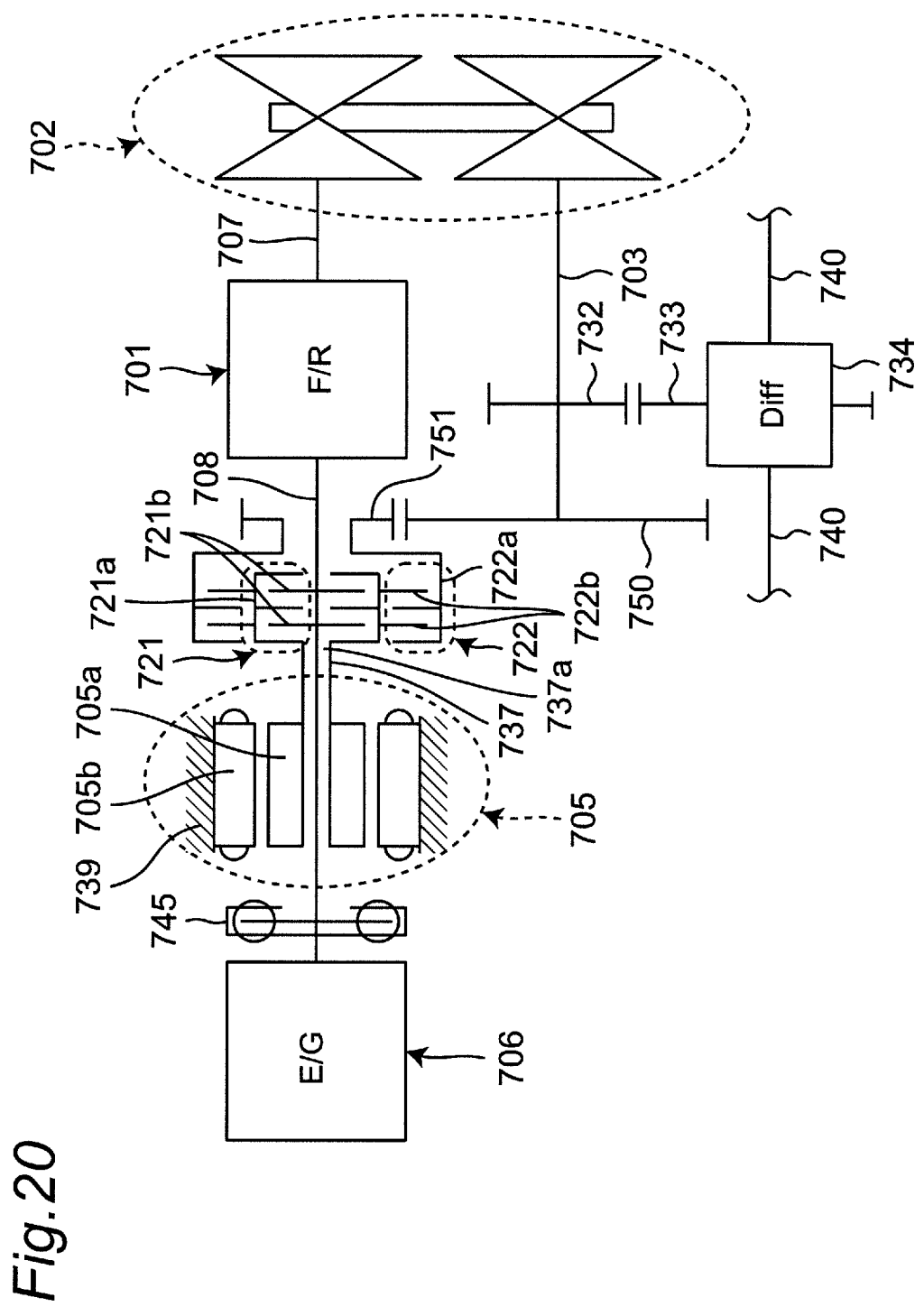
FIG. 20 is a schematic configuration view of a hybrid driving apparatus according to a modified example (1) of the sixth embodiment.
Figure 21:
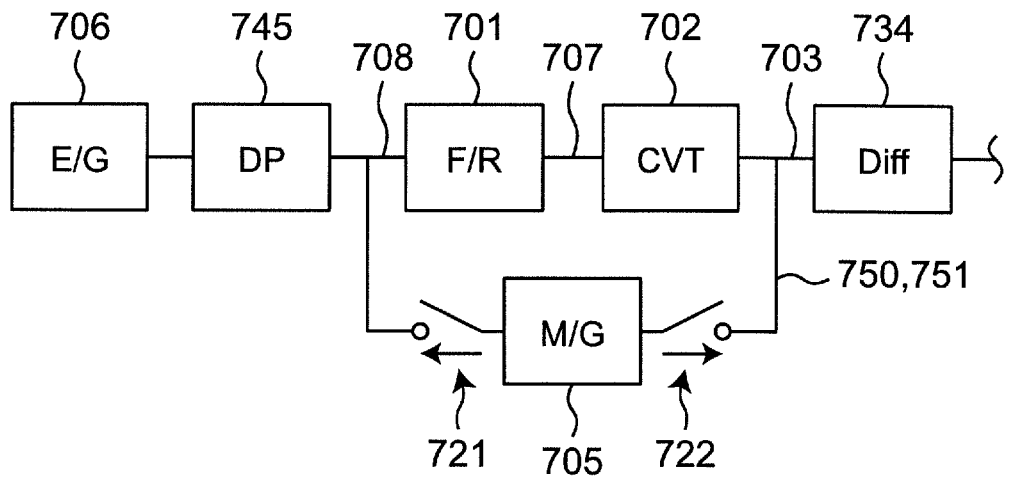
FIG. 21 is a power path block diagram of the hybrid driving apparatus according to the modified example (1) and a different modified example (3) of the sixth embodiment.

FIG. 20 is a schematic configuration view of a hybrid driving apparatus according to a modified example (1) of the sixth embodiment. FIG. 21 is a power path block diagram of each of hybrid driving apparatuses according to the modified example (1) and a different modified example (3) of the sixth embodiment. FIG. 21 illustrates a following situation. When a first clutch 721 is connected in an opened state of a second clutch 722, torque of the motor 705 is transmitted between the damper 745 and the forward-reverse switching mechanism 701. When the second clutch 722 is connected in an opened state of the first clutch 721 in an opposite case, torque of the motor 705 is transmitted between the transmission 702 and the differential 734.

In the first modified example (1) of the sixth embodiment, the first clutch 721 which transmits or cuts off torque from the motor 705 may be provided between the motor 705 and the forward-reverse switching mechanism 701, while the second clutch 722 which transmits or cuts off torque from the motor 705 may be provided between the motor 705 and the output shaft 703 of the transmission 702, as illustrated in FIGS. 20 and 21.

More specifically, the first clutch 721 is provided on the output shaft 708 of the engine 706 between the motor 705 and the forward-reverse switching mechanism 701. A clutch plate 721b of the first clutch 721 is connected to the output shaft 708 so as to be freely movable in the axial direction via a spline and fixed in the rotation direction to rotate integrally. A clutch case 721a of the first clutch 721 is fixed to the rotation shaft 737 connected to the rotor 705a of the motor 705. Accordingly, the first clutch 721 is capable of transmitting and cutting off torque from the motor 705 to the forward-reverse switching mechanism 701.

Moreover, a gear 750 is fixed to the output shaft 703 of the transmission 702. The gear 750 engages with a gear 751 to which the clutch case 722a of the second clutch 722 is fixed. The clutch plate 722b of the second clutch 722 is connected to a spline formed on an outer circumferential surface of the clutch cover 721a of the first clutch 721. The clutch plate 722b is connected so as to be freely movable in the axial direction and fixed in the rotation direction to rotate integrally. Accordingly, the second clutch 722 is capable of transmitting and cutting off torque from the motor 705 to the output shaft 703 of the transmission 702.

According to this modified example, the first clutch 721 and the second clutch 722 are provided as clutches for motor disconnection and connection. Accordingly, the motor 705 is disconnected by the clutches for motor disconnection and connection to reduce driving losses when the motor 705 is unnecessary during driving. Moreover, according to the configuration in FIG. 20, the motor input path is provided on the input side of the transmission 702 to connect the first clutch 721. In this case, the motor 705 is outputted via the transmission 702, wherefore an operation range of the motor 705 is expandable. Furthermore, during deceleration of the vehicle, the first clutch 721 is opened, while the second clutch 722 is connected. In addition, the clutch and the brake of the forward-reverse switching mechanism 701 are opened, while the engine output shaft 708 is disconnected. Accordingly, a regeneration energy quantity can be raised by eliminating engine friction losses. In addition, the clutch and the brake of the forward-reverse switching mechanism 701 are opened. In this condition, the first clutch 721 is connected, while the second clutch 722 is opened. In this case, regeneration energy can be generated by engine power even in a stop state of the vehicle.

Furthermore, the first clutch 721 and the second clutch 722 are disposed on inner and outer circumferences of a concentric circle. In this case, more reduction of an axial length is achievable than a configuration which positions the first clutch 721 and the second clutch 722 in series in the axial direction.

Figure 22:
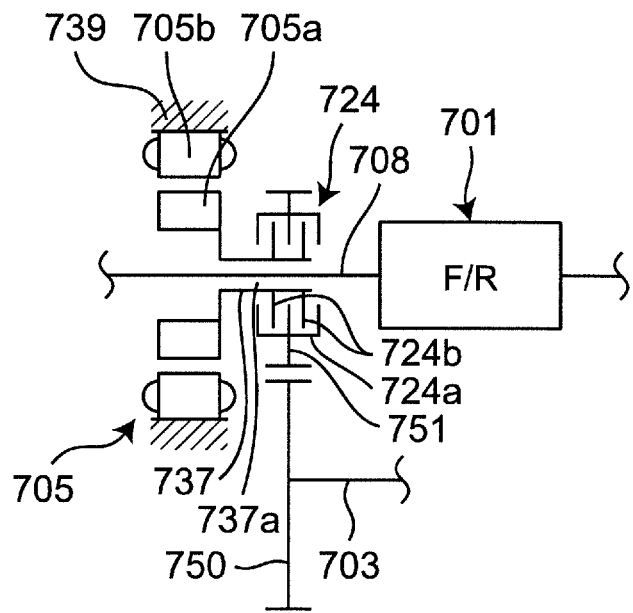
FIG. 22 is a schematic configuration view of a hybrid driving apparatus according to a different modified example (2) of the sixth embodiment.

FIG. 22 is a schematic configuration view of a hybrid driving apparatus according to a different modified example (2) of the sixth embodiment. In the modified example (2), only a second clutch 724 which transmits or cuts off torque from the motor 705 may be provided between the motor 705 and the output shaft 703 of the transmission 702.

According to the modified example (2), the second clutch 724 is provided as a clutch for motor disconnection and connection. Accordingly, the motor 705 is allowed to be disconnected by the clutch for motor disconnection and connection to reduce driving losses when the motor 705 is unnecessary during traveling.

Figure 23:
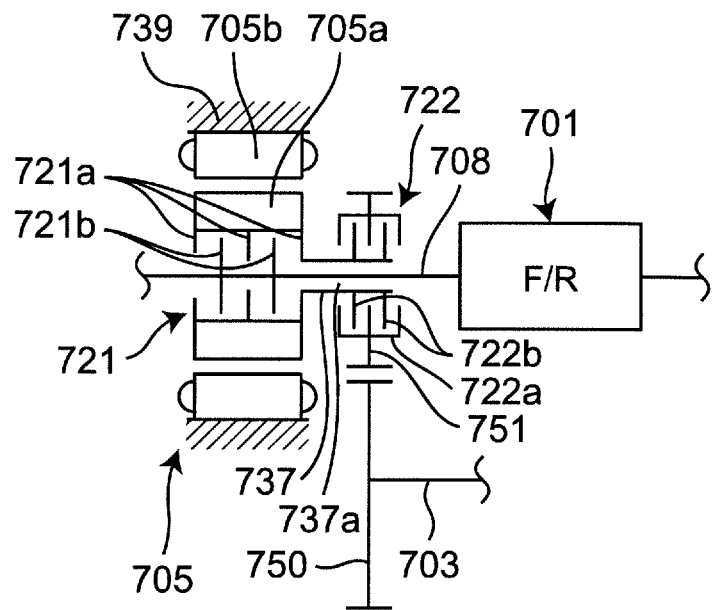
FIG. 23 is a schematic configuration view of a hybrid driving apparatus according to the different modified example (3) of the modified example (1) of the sixth embodiment.

FIG. 23 is a schematic configuration view of the hybrid driving apparatus according to the different modified example (3) of the modified example (1) of the sixth embodiment. In the modified example (3), the first clutch 721 may be disposed on the inner circumference of the rotor 705a of the motor 705.

The hybrid driving apparatus provided according to the modified example (3) achieves space saving more than the apparatus in the modified example (1).

Figure 24:
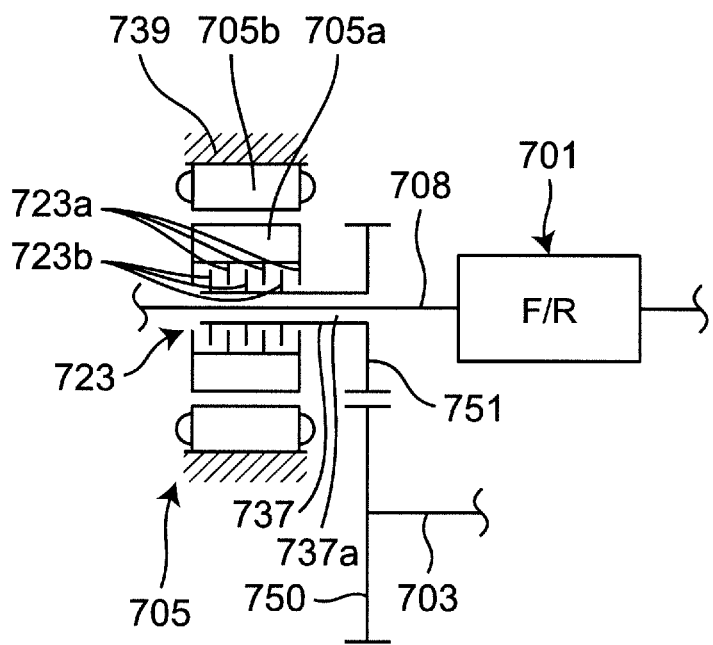
FIG. 24 is a schematic configuration view of a hybrid driving apparatus according to a different modified example (4) of the modified example (2) of the sixth embodiment.

FIG. 24 is a schematic configuration view of a hybrid driving apparatus according to a different modified example (4) of the modified example (2) of the sixth embodiment. In the modified example (4), only a second clutch 723 which transmits or cuts off torque from the motor 705 may be provided between the motor 705 and the output shaft 703 of the transmission 702. In addition, the second clutch 723 may be disposed on the inner circumference of the rotor 705a of the motor 705.

The hybrid driving apparatus provided according to the modified example (4) achieves space saving more than the hybrid driving apparatus in the modified example (2).

Finally, various aspects of the present invention are described.

Provided according to a first aspect of the present invention is a permanent magnet synchronous rotating electrical machine including:

a stator that includes an armature winding;

a rotor that is attached so as to be freely rotatable relative to the stator, and includes a permanent magnet inside the rotor;

a case that holds the stator and the rotor; and a stacking thickness variable mechanism that is disposed on the case and shifts the stator and the rotor relatively to each other along a rotation center axis of the rotor in accordance with a rotation speed of the rotor.

Provided according to a second aspect of the present invention is the permanent magnet synchronous rotating electrical machine described in the first aspect, wherein the stacking thickness variable mechanism includes a pressing and pulling mechanism that is connected so as to be freely rotatable relative to the rotor and shifts the stator and the rotor relatively to each other along the rotation center axis of the rotor in accordance with the rotation speed of the rotor.

Provided according to a third aspect of the present invention is the permanent magnet synchronous rotating electrical machine described in the first or second aspect, wherein the stacking thickness variable mechanism includes a pressing force generating mechanism that is connected so as to be freely rotatable relative to the rotor and applies pressing force to the rotor in a rotation axis direction in accordance with the rotation speed of the rotor, and a reaction force generating mechanism that is disposed on the side of the rotor opposite to the pressing force generating mechanism with the rotor interposed between the pressing force generating mechanism and the reaction force generating mechanism, and generates reaction force in the direction opposite to the direction of the pressing force acting along the rotation axis direction.

Provided according to a fourth aspect of the present invention is the permanent magnet synchronous rotating electrical machine described in any one of the first through third aspects, wherein the stacking thickness variable mechanism is connected to the stator and shifts the stator in the rotation axis direction of the rotor.

Provided according to a fifth aspect of the present invention is a permanent magnet synchronous rotating electrical machine driving system including:

the permanent magnet synchronous rotating electrical machine described in any one of the first through fourth aspects; and a controller that instantaneously or intermittently lowers output from the rotating electrical machine, or sets the output to zero during an operation of the stacking thickness variable mechanism.

Provided according to a sixth aspect of the present invention is a driving apparatus for vehicle, the apparatus being a hybrid system incorporated in a vehicle equipped with a transmission, wherein a power transmission path of an electric motor is connected to a differential shaft of a differential.

Provided according to a seventh aspect of the present invention is the driving apparatus for vehicle described in the sixth aspect, wherein the transmission is disposed in such a position that a front-rear direction of the vehicle and a shaft of the transmission cross each other at right angles.

Provided according to an eighth aspect of the present invention is the driving apparatus for vehicle described in the sixth aspect, wherein the differential shaft and the power transmission path of the electric motor are connected via an orthogonal gear.

Provided according to a ninth aspect of the present invention is the driving apparatus for vehicle described in the sixth aspect, wherein the connection between the power transmission path of the electric motor and the differential shaft is made by a pair of gears configured by a gear disposed on the differential shaft, and a gear disposed on an axis parallel to the differential shaft.

Provided according to a tenth aspect of the present invention is a power transmission apparatus for vehicle, the apparatus being incorporated in a vehicle equipped with a transmission, and the apparatus including a forward-reverse switching mechanism with start function produced by adding a function of a vehicle start clutch to the forward-reverse switching mechanism.

Provided according to an eleventh aspect of the present invention is the power transmission apparatus for vehicle described in the tenth aspect, wherein the forward-reverse switching mechanism with start function includes a planetary gear, a friction clutch, a friction brake, and a control mechanism that performs closing control of the friction clutch and the friction brake.

Provided according to another aspect of the present invention is the power transmission apparatus for vehicle described in the tenth or eleventh aspect, wherein each of the friction clutch and the friction brake of the forward-reverse switching mechanism with start function includes an input side member and an output side member, relative contact and separation between the input side member and the output side member being achievable by the closing control by the control mechanism, and at a start, the control mechanism performs the closing control of the friction clutch and the friction brake such that a state of the input side member and the output side member changes from an opened state where the input side member and the output side member are separated from each other, via a slip state where the input side member and the output side member contact each other with a relative slip, to a closed state where the input side member and the output side member come into relative contact with each other.

Provided according to a twelfth aspect of the present invention is the power transmission apparatus for vehicle described in the eleventh aspect, wherein capacities of the friction clutch and the friction brake of the forward-reverse switching mechanism with start function are larger than capacities of a friction clutch and a friction brake dedicated for a forward-reverse switching mechanism without start function.

Provided according to a thirteenth aspect of the present invention is the power transmission apparatus for vehicle described in the eleventh or twelfth aspect, wherein the planetary gear has sun gear input and ring gear output.

Provided according to a fourteenth aspect of the present invention is the power transmission apparatus for vehicle described in the eleventh or twelfth aspect, wherein the planetary gear has ring gear input and sun gear output.

Provided according to a fifteenth aspect of the present invention is the power transmission apparatus for vehicle described in the eleventh or twelfth aspect, wherein the friction clutch regulates relative rotations of a pinion carrier and a sun gear of the planetary gear.

Provided according to a sixteenth aspect of the present invention is the power transmission apparatus for vehicle described in the eleventh or twelfth aspect, wherein the friction clutch regulates relative rotations of a ring gear and a sun gear of the planetary gear.

Provided according to a seventeenth aspect of the present invention is the power transmission apparatus for vehicle described in the eleventh or twelfth aspect, wherein the friction clutch regulates relative rotations of a pinion carrier and a ring gear of the planetary gear.

Provided according to an eighteenth aspect of the present invention is the power transmission apparatus for vehicle described in the eleventh or twelfth aspect, wherein the friction brake regulates relative rotations of a pinion carrier of the planetary gear and a fixed end of the transmission.

Provided according to a nineteenth aspect of the present invention is a power transmission system for vehicle, the system including:

an internal combustion engine that is a power source for vehicle driving;

a transmission;

a torsional vibration damper that transmits torque of the internal combustion engine to the transmission; and the forward-reverse switching mechanism with start function incorporated in the power transmission apparatus for vehicle described in any one of the tenth through eighteenth aspects, the forward-reverse switching mechanism with start function being disposed between the transmission, and the internal combustion engine and the torsional vibration damper.

Provided according to a twentieth aspect of the present invention is the power transmission system for vehicle described in the nineteenth aspect, wherein an electric motor disposed on a downstream side of the internal combustion engine and the forward-reverse switching mechanism with start function is further added to constitute a hybrid system.

Provided according to a twenty-first aspect of the present invention is the power transmission system for vehicle described in the nineteenth or twentieth aspect, wherein the transmission includes gear pairs with parallel axes.

Provided according to a twenty-second aspect is the power transmission system for vehicle described in the nineteenth or twentieth aspect, wherein the transmission includes a plurality of planetary gears.

Provided according to a twenty-third aspect of the present invention is the power transmission system for vehicle described in the nineteenth or twentieth aspect, wherein the transmission includes a pair of pulleys capable of adjusting a distance between opposed sheave surfaces, and a band-shaped member laid between the pair of pulleys.

Provided according to a twenty-fourth aspect of the present invention is a driving apparatus for vehicle, the apparatus being configured by a Ravigneaux planetary gear, a friction clutch, and a friction brake, and including input paths of two systems and an output path of one system for the Ravigneaux planetary gear to adjust each input of the two systems and thereby perform variable adjustment of output of the one system.

Provided according to a twenty-fifth aspect of the present invention is the driving apparatus for vehicle described in the twenty-fourth aspect, wherein the Ravigneaux planetary gear includes a first sun gear, a second sun gear, a first pinion gear, a second pinion gear, and a ring gear.

Provided according to a twenty-sixth aspect of the present invention is the driving apparatus for vehicle described in the twenty-fifth aspect, wherein the first sun gear engages with the second pinion gear and the first pinion gear regulated by an identical pinion carrier, the second sun gear engages with the first pinion gear, and the first pinion gear and the ring gear engage with each other.

Provided according to a twenty-seventh aspect of the present invention is the driving apparatus for vehicle described in the twenty-fifth or twenty-sixth aspect, wherein the input paths of the two systems are connected such that a first input path is connected to the second sun gear, and a second input path is connected to the first sun gear, and the output path of the one system is connected to the ring gear.

Provided according to a twenty-eighth aspect of the present invention is the driving apparatus for vehicle described in any one of the twenty-fourth through twenty-seventh aspects, wherein the input paths of the two systems are connected such that a first input path is connected to the internal combustion engine, and a second input path is connected to an electric motor.

Provided according to a twenty-ninth aspect of the present invention is the driving apparatus for vehicle described in the twenty-seventh aspect, wherein the input paths of the two systems are connected such that a first input path is connected to an electric motor, and a second input path is connected to an internal combustion engine.

Provided according to a thirtieth aspect of the present invention is the driving apparatus for vehicle described in any one of the twenty-fourth through twenty-seventh aspects, wherein the input paths of the two systems are connected such that a first input path is connected to a first electric motor, and a second input path is connected to a second electric motor.

Provided according to a thirty-first aspect of the present invention is the driving apparatus for vehicle described in the twenty-sixth aspect, wherein the friction clutch regulates relative rotations of any two elements selected from the first sun gear, the second sun gear, the pinion carrier, and the ring gear, and the friction brake regulates relative rotations of the pinion carrier and a fixed end.

Provided according to a thirty-second aspect of the present invention is a hybrid driving apparatus including a forward-reverse switching mechanism, a transmission, an input path disposed on the output side of the forward-reverse switching mechanism, and a motor connected to the input path.

Provided according to a thirty-third aspect of the present invention is the hybrid driving apparatus described in the thirty-second aspect, wherein the forward-reverse switching mechanism includes a friction clutch, a friction brake, and a planetary gear, the planetary gear includes a sun gear, a pinion gear engaging with the sun gear, and a ring gear engaging with the pinion gear, engine input is inputted to the sun gear of the planetary gear via a starting device, the friction clutch is connected to the sun gear and the pinion gear, and the friction brake is connected to the pinion gear and the ring gear is connected to an input shaft of the transmission.

Provided according to a thirty-fourth aspect of the present invention is the hybrid driving apparatus described in the thirty-third aspect, wherein the starting device is a torque converter.

Provided according to a thirty-fifth aspect of the present invention is the hybrid driving apparatus described in the thirty-third aspect, wherein a gear is formed on an outer circumferential surface of the ring gear of the planetary gear, and defines the input path.

Provided according to a thirty-sixth aspect of the present invention is the hybrid driving apparatus described in the thirty-fifth aspect, wherein an output shaft of the motor is connected to the input path via a gear that engages with the gear formed on the outer circumferential surface of the ring gear.

Provided according to a thirty-seventh aspect of the present invention is the hybrid driving apparatus described in the thirty-third aspect, wherein an outer circumferential surface of the ring gear is defined by a sprocket in the input path, and an output shaft of the motor is connected to the sprocket via a chain.

Provided according to a thirty-eighth aspect of the present invention is the hybrid driving apparatus described in the thirty-third aspect, wherein the input path is disposed on a side surface of the ring gear.

Provided according to a thirty-ninth aspect of the present invention is the hybrid driving apparatus described in the thirty-second aspect, wherein the input path is disposed on an input shaft of the transmission.

Provided according to a fortieth aspect of the present invention is a hybrid driving apparatus including a forward-reverse switching mechanism, a transmission, and a motor connected to an output shaft of the transmission via a gear.

Provided according to a forty-first aspect of the present invention is the hybrid driving apparatus described in the fortieth aspect, wherein the motor is disposed coaxially between an engine and the transmission.

Provided according to a forty-second aspect of the present invention is the hybrid driving apparatus described in the forty-first aspect, wherein the forward-reverse switching mechanism includes a friction clutch, a friction brake, and a planetary gear, the planetary gear includes a sun gear, a pinion gear engaging with the sun gear, and a ring gear engaging with the pinion gear, engine input is inputted to the sun gear of the planetary gear, the friction clutch is connected to the sun gear and the pinion gear, the friction brake is connected to the pinion gear, and the ring gear is connected to an input shaft of the transmission.

Provided according to a forty-third aspect of the present invention is the hybrid driving apparatus described in the forty-second aspect, wherein the friction clutch and the brake are a friction clutch and a friction brake to each of which a function of a vehicle start clutch is added, respectively.

Provided according to a forty-fourth aspect of the present invention is the hybrid driving apparatus described in any one of the fortieth through forty-third aspects, wherein a first clutch that transmits or cuts off torque from the motor is provided between the motor and the forward-reverse switching mechanism, and a second clutch that transmits or cuts off torque from the motor is provided between the motor and the transmission.

Provided according to a forty-fifth aspect of the present invention is the hybrid driving apparatus described in the forty-fourth aspect, wherein the first clutch and the second clutch are disposed on inner and outer circumferences of a concentric circle.

Provided according to a forty-sixth aspect of the present invention is the hybrid driving apparatus described in the forty-fourth aspect, wherein the first clutch and the second clutch are disposed coaxially between the motor and the forward-reverse switching mechanism.

Provided according to a forty-seventh aspect of the present invention is the hybrid driving apparatus described in the forty-fourth aspect, wherein the first clutch is disposed on the inner circumference of the motor, and the second clutch is disposed coaxially between the motor and the forward-reverse switching mechanism.

Provided according to a forty-eighth aspect of the present invention is the hybrid driving apparatus described in any one of the fortieth through forty-third aspects, wherein a second clutch that transmits or cuts off torque from the motor is provided between the motor and the transmission.

Provided according to a forty-ninth aspect of the present invention is the hybrid driving apparatus described in the forty-eighth aspect, wherein the second clutch is disposed coaxially between the motor and the forward-reverse switching mechanism.

Provided according to a fiftieth aspect of the present invention is the hybrid driving apparatus described in the forty-eighth aspect, wherein the second clutch is disposed on the inner circumference of the motor.

By properly combining the arbitrary embodiment(s) or modified example(s) of the aforementioned various embodiments and modified example(s), the effects possessed by the embodiment(s) or modified example(s) can be produced. Moreover, combinations of the embodiments, combinations of the working examples, and combinations of the embodiment(s) and the working example(s) may be made. Furthermore, combinations of the features included in the different embodiments or working examples may be made.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

A power transmission apparatus for vehicle and a power transmission system for vehicle according to the present invention are capable of fulfilling a space reduction demand by integrating functions of a start device and a forward-reverse switching mechanism conventionally provided as different components into one apparatus, and therefore are capable of constituting a hybrid system even in a limited space, and applicable to various types of vehicles including a compact car.

REFERENCE SIGNS LIST 1. armature winding
2. stator
4. rotor
5. case
6. stacking thickness variable mechanism
8. pressing force generating mechanism
9. reaction force generating mechanism
10. controller
14. rotation center axis
20. stacking thickness variable rotating electrical machine
291. input side member
292. output side member
311. transmission
311a. sheave surface
311b. pulley
311c. band-shaped member
312. forward-reverse switching mechanism with start function
313. planetary gear
314. friction clutch
315. friction brake 316. control mechanism
317. sun gear
319. ring gear
320. input shaft
321. output shaft
322. pinion carrier
325. fixed end of transmission (case)
330. electric motor
330a. stator
330b. rotor
331. engine
332. damper
340. input side member
341, 344. disk
342. output side member
343, 345. driven plate

The invention claimed is:

1. A power transmission apparatus for vehicle, the apparatus, incorporated in a vehicle equipped with a transmission, comprising:
a forward-reverse switching mechanism with start function produced by adding a function of a vehicle start clutch to the forward-reverse switching mechanism; and
an electric motor disposed axially between the forward-reverse switching mechanism and the transmission,
an output shaft of the forward-reverse switching mechanism being connected to the electric motor.

2. The power transmission apparatus for vehicle according to claim 1, wherein the forward-reverse switching mechanism with start function includes a planetary gear, a friction clutch, a friction brake, and a control mechanism that performs closing control of the friction clutch and the friction brake.

3. The power transmission apparatus for vehicle according to claim 2, wherein
the friction clutch and the friction brake of the forward-reverse switching mechanism with start function includes an input side member and an output side member, relative contact and separation between the input side member and the output side member being achieved by the closing control performed by the control mechanism, and
at a start, the control mechanism performs the closing control of the friction clutch and the friction brake such that a state of the input side member and the output side member changes from an opened state where the input side member and the output side member are separated from each other, via a slip state where the input side member and the output side member contact each other with relative slip, to a closed state where the input side member and the output side member come into relative contact with each other.

4. The power transmission apparatus for vehicle according to claim 3, wherein capacities of the friction clutch and the friction brake of the forward-reverse switching mechanism with start function are larger than capacities of a friction clutch and a friction brake dedicated for a forward-reverse switching mechanism without start function.

5. The power transmission apparatus for vehicle according to claim 3, wherein the planetary gear has sun gear input and ring gear output.

6. The power transmission apparatus for vehicle according to claim 2, wherein capacities of the friction clutch and the friction brake of the forward-reverse switching mechanism with start function are larger than capacities of a friction clutch and a friction brake dedicated for a forward-reverse switching mechanism without start function.

7. The power transmission apparatus for vehicle according to claim 2, wherein the planetary gear has ring gear input and sun gear output.

8. The power transmission apparatus for vehicle according to claim 2, wherein the friction clutch regulates relative rotations of a pinion carrier and a sun gear of the planetary gear.

9. The power transmission apparatus for vehicle according to claim 2, wherein the friction clutch regulates relative rotations of a ring gear and a sun gear of the planetary gear.

10. The power transmission apparatus for vehicle according to claim 2, wherein the friction clutch regulates relative rotations of a pinion carrier and a ring gear of the planetary gear.

11. The power transmission apparatus for vehicle according to claim 2, wherein the friction brake regulates relative rotations of a pinion carrier of the planetary gear and a fixed end of the transmission.

12. A power transmission system for vehicle, the system comprising:
an internal combustion engine that is a power source for vehicle driving;
a transmission;
a torsional vibration damper that transmits torque of the internal combustion engine to the transmission; and
the power transmission apparatus for vehicle according to claim 2,
the forward-reverse switching mechanism with start function being disposed between the transmission, and the internal combustion engine and the torsional vibration damper.

13. A power transmission system for vehicle, the system comprising:
an internal combustion engine that is a power source for vehicle driving;
a transmission;
a torsional vibration damper that transmits torque of the internal combustion engine to the transmission; and
the power transmission apparatus for vehicle according to claim 1,
the forward-reverse switching mechanism with start function being disposed between the transmission, and the internal combustion engine and the torsional vibration damper.

14. The power transmission system for vehicle according to claim 13, wherein an electric motor disposed on a downstream side of the internal combustion engine and the forward-reverse switching mechanism with start function is further added to constitute a hybrid system.

15. The power transmission system for vehicle according to claim 13, wherein the transmission includes gear pairs with parallel axes.

16. The power transmission system for vehicle according to claim 13, wherein the transmission includes a plurality of planetary gears.

17. The power transmission system for vehicle according to claim 13, wherein the transmission includes a pair of pulleys configured to adjust a distance between opposed sheave surfaces, and a band-shaped member laid between the pair of pulleys.

18. A power transmission apparatus for vehicle, the apparatus, incorporated in a vehicle equipped with a transmission, comprising a forward-reverse switching mechanism with start function produced by adding a function of a vehicle start clutch to the forward-reverse switching mechanism, wherein the forward-reverse switching mechanism with start function includes a planetary gear, a friction clutch, a friction brake, and a control mechanism that performs closing control of the friction clutch and the friction brake, and the planetary gear has sun gear input and ring gear output.

* * * * *